(12) United States Patent
Rossi et al.

(10) Patent No.: US 11,794,826 B2
(45) Date of Patent: Oct. 24, 2023

(54) HOIST SYSTEM FOR A MOTOR VEHICLE

(71) Applicant: VENTRA GROUP, CO., Halifax (CA)

(72) Inventors: Tim G. Rossi, Bolton (CA); Terry Hu, Markham (CA)

(73) Assignee: VENTRA GROUP CO., Halifax (CA)

( * ) Notice: Subject to any disclaimer, the term of this patent is extended or adjusted under 35 U.S.C. 154(b) by 0 days.

(21) Appl. No.: 17/724,100

(22) Filed: Apr. 19, 2022

(65) Prior Publication Data

US 2022/0340215 A1 Oct. 27, 2022

Related U.S. Application Data

(60) Provisional application No. 63/178,127, filed on Apr. 22, 2021.

(51) Int. Cl.
  *B62D 43/04* (2006.01)
  *B62D 43/00* (2006.01)

(52) U.S. Cl.
  CPC ......... *B62D 43/045* (2013.01); *B62D 43/002* (2013.01)

(58) Field of Classification Search
  CPC ...... B62D 43/045; B62D 43/04; B62D 43/00; B62D 43/002; B66D 1/64; B66D 1/34; B66D 1/00; B66D 2700/0183; B66D 2700/023
  USPC .......................................................... 254/323
  See application file for complete search history.

(56) References Cited

U.S. PATENT DOCUMENTS

| | | | | |
|---|---|---|---|---|
| 4,625,947 A * | 12/1986 | Denman | .................. | B66D 1/34 254/323 |
| 4,997,164 A * | 3/1991 | Kito | ..................... | B62D 43/045 254/323 |
| 6,923,394 B2 * | 8/2005 | Goldstein | ............ | B62D 43/045 414/466 |
| 7,404,545 B2 * | 7/2008 | Steiner | .................. | B62D 43/00 254/323 |
| 7,621,507 B2 * | 11/2009 | Reznar | ................. | B62D 43/045 254/323 |
| 7,837,179 B2 | 11/2010 | Steiner, Jr. et al. | | |
| 8,851,455 B2 | 10/2014 | Rossi et al. | | |
| 10,329,128 B2 * | 6/2019 | Clarke | ................... | B66D 1/005 |
| 2012/0121366 A1 * | 5/2012 | Ogawa | ................... | B62D 43/04 254/323 |
| 2014/0072394 A1 | 3/2014 | Rossi et al. | | |
| 2014/0271067 A1 | 9/2014 | Rossi et al. | | |

* cited by examiner

*Primary Examiner* — Michael R Mansen
*Assistant Examiner* — Henrix Soto
(74) *Attorney, Agent, or Firm* — Pillsbury Winthrop Shaw Pittman, LLP

(57) ABSTRACT

A cable hoist system for a spare tire carrier in a vehicle includes a housing; a drive cable; a reel assembly; and a drive mechanism. A first gear assembly of the drive mechanism includes a control plate member connected to a first gear using at least two frangible connectors. The at least two frangible connectors connecting the control plate member and the first gear provides a frangible connection in the first gear assembly such that, when the first gear assembly is subject to a force exceeding a predetermined value caused by momentum of a spare tire applied through the reel assembly and a second gear of a second gear assembly, the at least two frangible connectors break to allow the first gear to move relative to the control plate member such that the second gear and the reel assembly can rotate to allow for pay out of the drive cable.

11 Claims, 31 Drawing Sheets

HOIST SYSTEM FOR A MOTOR VEHICLE

CROSS REFERENCE TO RELATED APPLICATIONS

The subject application claims priority to U.S. Provisional Application No. 63/178,127, filed Apr. 22, 2021, the contents of which is incorporated herein by reference in entirety.

BACKGROUND

Field

The present patent application relates to a hoist system for a motor vehicle.

DESCRIPTION OF RELATED ART

A hoist system for a spare tire/wheel carrier in a motor vehicle can be a cable type winch/hoist system that generally use a cable as the lifting device to support weight of a load (e.g., spare tire). The cable hoist system generally includes a housing/shroud, a drive shaft/input, a reel assembly including a spool, the cable, and a drive/brake mechanism (including a control plate assembly/a hypocycloidal gear assembly). The spare tire carrier may also be referred to as a winch or a hoist. One end of the cable is connected within the housing of the hoist system while the other end of the cable extends outside of the housing and is connected to an end piece, so that the load/spare tire can be attached to the cable via an attachment device connected thereto.

During a vehicle crash, it is desirable that the cable for the spare tire carrier/winch not break, but rather unspool while the spare tire is still being attached to it.

Existing/prior art hoist systems and methods that maintain connection between the spare tire and the winch, during the vehicle crash, generally include 1) use of a larger cable to increase the minimum breaking strength of the cable; 2) use of a secondary cable/tether to 'catch' the spare tire if/when the main cable breaks; and 3) fracture of internal components (e.g., made of steel or plastic) to allow some displacement of the main cable. Each of these existing/prior art spare tire carrier methods/systems have their own drawbacks.

For example, larger cables, which are used to increase the minimum breaking strength of the cable, are heavy and are more expensive. Also, larger cables require a larger package for the winch.

The secondary cable/tether, which is used to 'catch' the spare tire if/when the main cable breaks, is also expensive and can require extra assembly by the vehicle owner. Function of the secondary cable hoist system could be jeopardized if the secondary cable is not properly connected (or is not at all connected).

Lastly, the hoist system/method, which fractures/breaks its internal components (e.g., breakable plastic parts) to allow some displacement/movement of the main cable, generally limits the cable extension (e.g., approximately between 10 and 50 millimeters (mm)). For example, FIG. 1A shows various views of an exemplary control plate 1000 with two grooves 1002, 1004 near its elongated slot 1006. These break/fracture grooves 1002, 1004, when overloaded, brake/fracture to allow some displacement of the main cable as discussed in the third prior art spare tire carrier system above. This configuration may allow some cable movement but may not prevent the cable from breaking and may not allow the cable to unspool entirely.

Further, U.S. Pat. No. 8,851,455 and U.S. Patent Application Publication No. 2014/0271067 provide some examples of hoist systems for the spare tire/wheel carrier in the motor vehicle, which are hereby incorporated by reference in their entirety.

Also, U.S. Pat. No. 10,329,128 ("the '128 patent"), U.S. Pat. No. 7,621,507 ("the '507 patent"), and U.S. Pat. No. 7,837,179 ("the '179 patent") disclose other exemplary prior art/existing hoist systems for the spare tire/wheel carrier in the motor vehicle.

For example, the '128 patent discloses a single, radially extending breakable tab between its gear and its control plate.

The '507 patent discloses a breakaway feature inside its reel. That is, the '507 patent discloses a fracture between its gear and its body of its sheave, using plastic materials.

In the '179 patent, there are embodiments where the pin 135/135' does break. For example, the pin may break, or the plate 25 would break along the dashed line 170. The plate movement would be absorbed by the housing. However, the design is much more complex because the control plate and gear remain connected and the housing is designed to absorb the movement of the control plate to control the payout.

The present patent application provides an improved cable hoist system that obviates the shortcomings associated with the prior art spare tire carrier assemblies discussed above.

BRIEF SUMMARY

In one embodiment of the present patent application, a cable hoist system for a spare tire carrier in a vehicle is provided. The cable hoist system includes a housing, a drive cable, a reel assembly, and a drive mechanism. The housing is configured for supporting a drive shaft for rotation about an axis. The drive cable is configured for supporting a spare tire and for lifting or lowering the spare tire. The reel assembly is mounted in the housing and is configured to wind and unwind the drive cable thereof for lifting or lowering the spare tire. The drive cable has opposing end portions, one end portion of the drive cable is connected to the reel assembly and the other end portion of the drive cable is connected to a spare tire holder for holding the spare tire. The drive mechanism is configured to transfer the rotation of the drive shaft to the reel assembly. The drive mechanism comprises a first gear assembly and a second gear assembly. The first gear assembly has a first gear with a plurality of external teeth thereon. The first gear assembly includes a control plate member connected to the first gear using at least two frangible connectors. The control plate member is configured to be driven by rotation of the drive shaft to revolve the first gear in a hypocycloidal path around the axis of the drive shaft. The second gear assembly is disposed in the reel assembly. The second gear assembly has a second gear configured to surround the first gear and having a plurality of internal teeth for meshing engagement with the external teeth of the first gear such that hypocycloidal revolution of the first gear rotates the second gear to rotate the reel assembly. The at least two frangible connectors extend axially along the axis and are circumferentially disposed about the axis. The at least two frangible connectors connecting the control plate member and the first gear provides a frangible connection in the first gear assembly such that, when the first gear assembly is subject to a force exceeding a predetermined value caused by momentum of the spare tire applied through the reel assembly and the second gear, the at least two frangible connectors break to allow the first gear to move relative to the control plate member such that the second gear and the reel assembly can rotate to allow for pay out of the drive cable.

These and other aspects of the present patent application, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE DRAWINGS

Figure 1A:
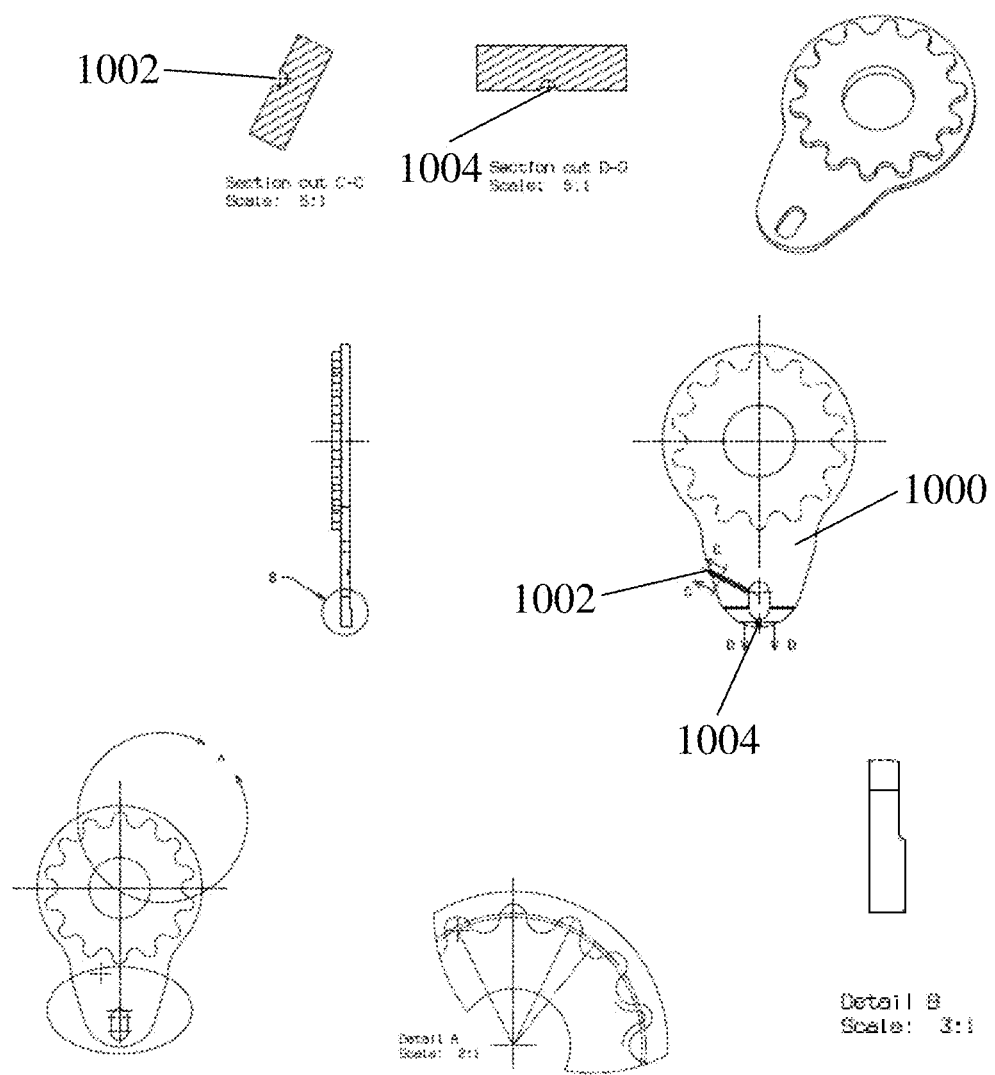
FIG. 1A shows various views of an exemplary prior art cable hoist system for a spare tire carrier in a motor vehicle.

FIGS. 1B-4 show a hoist system 10 for a spare tire carrier in a motor vehicle in accordance with an embodiment of the present patent application. The construction of the vehicle/motor vehicle, and the vehicle body thereof are not considered to be part of the present patent application and thus will not be detailed herein. Instead, the present patent application is concerned in detail with the hoist system 10. In one embodiment, as will be discussed in detail below, the hoist system 10 is a cable type hoist system. The hoist system 10 may also interchangeably referred to as cable hoist system or spare tire carrier system.

In one embodiment, the cable hoist system 10 for the spare tire carrier in the vehicle includes a housing 12, a drive cable 16, a reel assembly 30, and a drive mechanism 104. The housing 12 is configured for supporting a drive shaft 14 for rotation about an axis B-B. The drive cable 16 is configured for supporting a spare tire (not shown) and for lifting or lowering the spare tire. The reel assembly 30 is mounted in the housing 12 and is configured to wind and unwind the drive cable 16 thereof for lifting or lowering the spare tire. The drive cable 16 has opposing end portions, one end portion of the drive cable 16 is connected to the reel assembly 30 and the other end portion of the drive cable 16 is connected to a spare tire holder 18 for holding the spare tire.

The drive mechanism 104 is configured to transfer the rotation of the drive shaft 14 to the reel assembly 30. The drive mechanism 104 comprises a first gear assembly 50 and a second gear assembly 102. The first gear assembly 50 has a first gear 52 with a plurality of external teeth 58 thereon. The first gear assembly 50 also includes a control plate member 56 connected to the first gear 52 using at least two frangible connectors 54. The control plate member 56 is configured to be driven by rotation of the drive shaft 14 to revolve the first gear 52 in a hypocycloidal path around the axis B-B of the drive shaft 14. The second gear assembly 102 is disposed in the reel assembly 30. In one non-limiting embodiment, the first gear assembly 50 may interchangeably referred to as control plate assembly, and the first gear assembly and the control plate assembly may be represented by the same reference numeral 50. The second gear assembly 102 has a second gear 102 configured to surround the first gear 52 and having a plurality of internal teeth 106 for meshing engagement with the external teeth 58 of the first gear 52 such that hypocycloidal revolution of the first gear 52 rotates the second gear 102 to rotate the reel assembly 30. In the discussions below, the second gear assembly and the second gear may interchangeably represented by the reference number 102. The at least two frangible connectors extend axially along the axis and are circumferentially disposed about the axis. The at least two frangible connectors 54 connecting the control plate member 56 and the first gear 52 provides a frangible connection 76 in the first gear assembly 50 such that, when the first gear assembly 50 is subject to a force exceeding a predetermined value caused by momentum of the spare tire applied through the reel assembly 30 and the second gear 102, the at least two frangible connectors 54 break to allow the first gear 52 to move relative to the control plate member 56 such that the second gear 102 and the reel assembly 30 can rotate to allow for pay out of the drive cable 16. In one non-limiting embodiment, the frangible connectors 54 may include rivets 54. In some non-limiting embodiments, the frangible connectors may be interchangeably referred to as rivets, and the frangible connectors and the rivets may be interchangeably represented by the reference number 54.

The cable hoist system 10 and its illustrated external parts shown in FIGS. 1B-4 are exemplary and for reference only. Such illustrations are not intended to be limiting. A hoist, like the cable hoist system 10, is a device used for lifting or lowering a load (e.g., a spare wheel or a spare tire—not shown in the drawings) by means of a drum or lift-wheel—in this disclosure, called the reel 30—around which the drive cable 16 wraps and is configured to move therealong. It may be manually operated (e.g., by a set of tools used with a vehicle jack), electrically driven, or fluidly driven (i.e., pneumatically or hydraulically), and thus any type of drive input may be used. In accordance with an embodiment of this disclosure, the cable hoist system 10 is used as a spare wheel/tire hoist or winch on a transportation vehicle (e.g., car, truck, van, SUV, etc.) to secure the spare tire/wheel to the vehicle. In accordance with an embodiment, the disclosed reel assembly 30 is set in and used in the spare tire carrier system provided at an underside of the vehicle, such as the undercarriage.

By contrast to the '128 patent mentioned in the background section, the cable hoist system 10 of the present patent application includes a plurality of (at least two or three) axially extending frangible connections/fasteners. That is, the plurality of frangible connections/fasteners extend axially in the direction of the axis B-B of FIG. 1B. In one embodiment, the plurality of frangible connections/fasteners include shear pins. In one embodiment, the plurality of frangible connections/fasteners between the first gear 52 and the control plate member 56 are circumferentially distributed about the axis B-B of FIG. 1B. Applicant has found that the configuration of axially extending and circumferentially distributed frangible connections/fasteners of the present patent application provides several advantages over the prior art cable hoist systems including the '128 patent. For example, the configuration of axially extending and circumferentially distributed frangible connections/fasteners of the present patent application facilitate not only smaller packaging but also easier installation/assembly/manufacturing. The configuration of axially extending and circumferentially distributed frangible connections/fasteners of the present patent application also allow the loads/forces to be evenly distributed.

Figure 3:
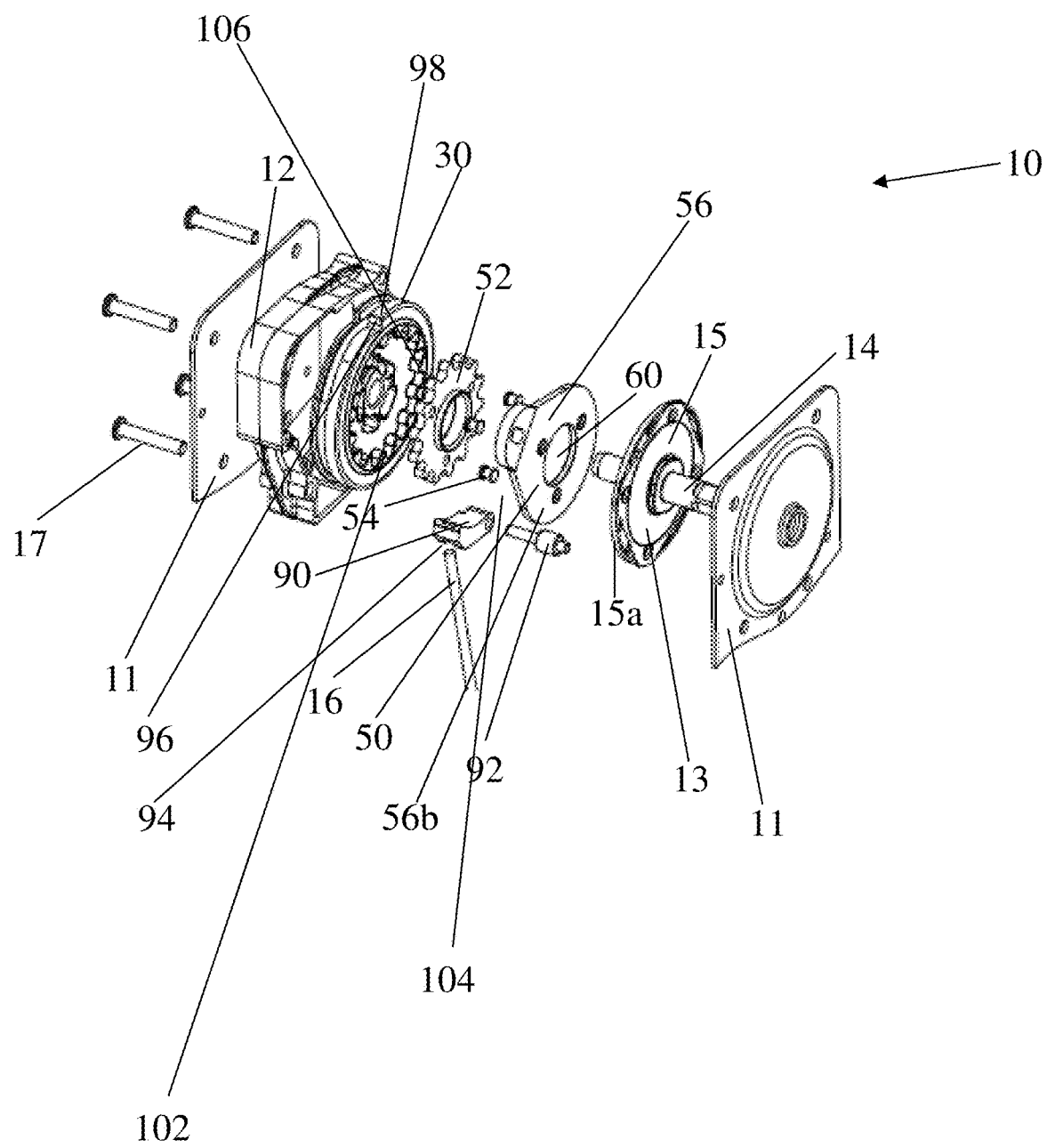
FIG. 3 shows a partial exploded view of the cable hoist system of FIG. 1B in accordance with an embodiment of the present patent application.

In one embodiment, the housing of the hoist system 10 includes protective shroud 12 extending between two end plates/covers 11 as shown in FIG. 3. The shroud 12 is mounted within the vehicle, such as in an undercarriage. It should be understood that the first gear assembly/control plate assembly 50 (including the control plate member 56, the first gear 52, and the frangible connectors or rivets 54), the cable reel assembly 30, the drive cable 16, the drive/brake mechanism (including clutch sub-assembly 13), and/or other components of the hoist system 10 are all covered and protected from the environment by the shroud 12. In one embodiment, the housing 12 includes the reel assembly 30, the drive mechanism (including external/first gear assembly and internal/second gear assembly), the drive cable 16, and and/or other components of the hoist system 10.

In one embodiment, the housing of the hoist system 10 includes four rivets 17 that are configured to connect the two end plates/covers 11 to each other with the shroud 12 extending therebetween and containing the above-discussed components of the hoist system 10. In one embodiment, the housing includes a portion configured to secure the hoist system 10 to a portion of the motor vehicle.

The housing 12 is configured for supporting a drive/an input shaft 14 for rotation about the axis B-B. The housing 12 includes a slot/opening therethrough. The cable reel assembly 30 is configured to be directly connected to the drive shaft 14 through the slot/opening of the housing 12.

In one embodiment, referring to FIGS. 1B-4, the drive cable 16 is interchangeably referred to as cable or wire rope. The cable or drive cable 16 is used as the lifting device and to support the weight of the load (e.g., spare tire/wheel). In one embodiment, the drive cable 16 is configured for supporting the spare tire and for lifting or lowering the spare tire.

In one embodiment, the drive cable 16 is guided along by the cable reel assembly 30. In one embodiment, the drive cable 16 is spirally wound (e.g., in an overlapping manner) on a hub of the cable reel assembly 30. In one embodiment, the drive cable 16 is configured to pass through a passage/opening 94 of a downstop/pawl 90 (discussed in detail below). In one embodiment, one end of the drive cable 16 is connected within the housing/shroud 12 or the reel assembly 30 of the hoist system 10 while the other end of the drive cable 16 extends outside of the housing/shroud 12 or the reel assembly 30 and is connected to an end piece 22 (also called an end fitting), so that the load/spare tire can be attached to the drive cable 16 via an attachment device 18 connected thereto. In one non-limiting embodiment, the attachment device 18 may be interchangeably referred to as spare tire holder, and the attachment device and the spare tire holder may interchangeably be represented by the same reference numeral 18. The drive cable 16 can be moved in either a clockwise direction or a counterclockwise direction.

In one embodiment, the drive cable 16 used with the disclosed reel assembly 30 does not require any particular design or configuration. Traditional cable may be used. The drive cable 16 has a diameter, which also corresponds to a cable size. The length, the material and the diameter of the drive cable 16 used with the spare tire carrier is selected from loading criteria from the car manufacturer (e.g., customer). The tire mass and vehicle g forces can be considered in determining the length, the material and the diameter of the drive cable 16.

In one embodiment, the drive cable 16 is a flexible cable. In another embodiment, the drive cable 16 is made of metal material. In yet another embodiment, the drive cable 16 is made of stainless steel material. In one embodiment, an inner end portion (having a fitting or like thereon) of the drive cable 16 is secured or connected to the reel assembly 30.

In one embodiment, referring to FIGS. 1B-4, an end of the drive cable 16 extends downwardly from the shroud 12 and is connected to the end piece 22. The load (e.g., spare tire) is attached to the cable hoist system 10 by a hook, bracket, or other type of attachment device. The attachment device or the spare tire holder 18 is provided adjacent to the same end of the cable of the end piece 22. For example, spare tire can be attached via the middle opening of its rim to the attachment device or the spare tire holder 18. For example, the attachment device or the spare tire holder 18 can be an oblong bracket that the user can fit through the opening in the spare tire rim by tilting it as the end piece 22 is fed through the opening in the spare tire rim. Because the oblong slope is longer than the spare tire rim opening's diameter, the spare tire rim will sit on flanges 18F of the attachment device or the spare tire holder 18. The attachment device or the spare tire holder 18 is interchangeably referred to as the spare wheel/tire holder that is configured for holding the spare tire/wheel.

In one embodiment, between the attachment device or the spare tire holder 18 and the end piece 22 is an energy absorber member 20. The energy absorber member 20 is mounted between and adjacent to the attachment device or the spare tire holder 18 and is configured for movement between a storage position and an extended position to absorb movement of the spare tire, e.g., during driving of the vehicle. In one embodiment, the energy absorber member 20 is an elastic member. In another embodiment, the energy absorber member 20 is a compression spring.

Figure 4:
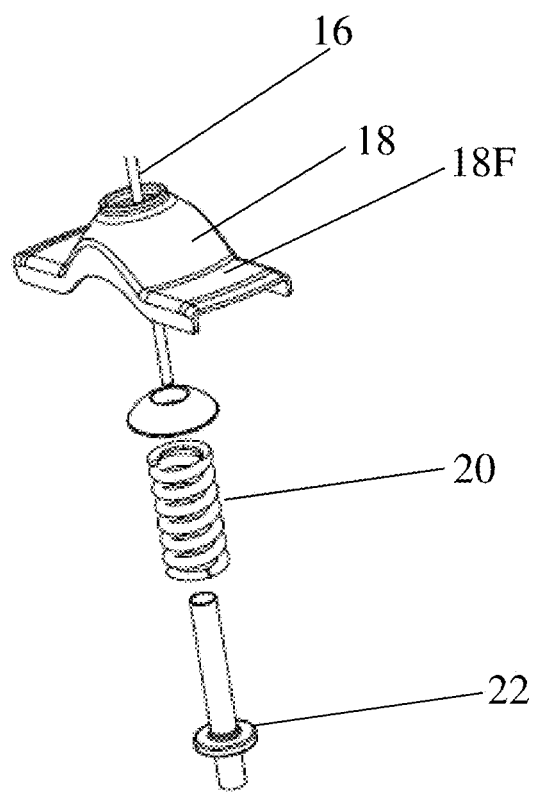
FIG. 4 shows an exploded view of an end portion of the cable hoist system of FIG. 1B in accordance with an embodiment of the present patent application.
Figure 5:
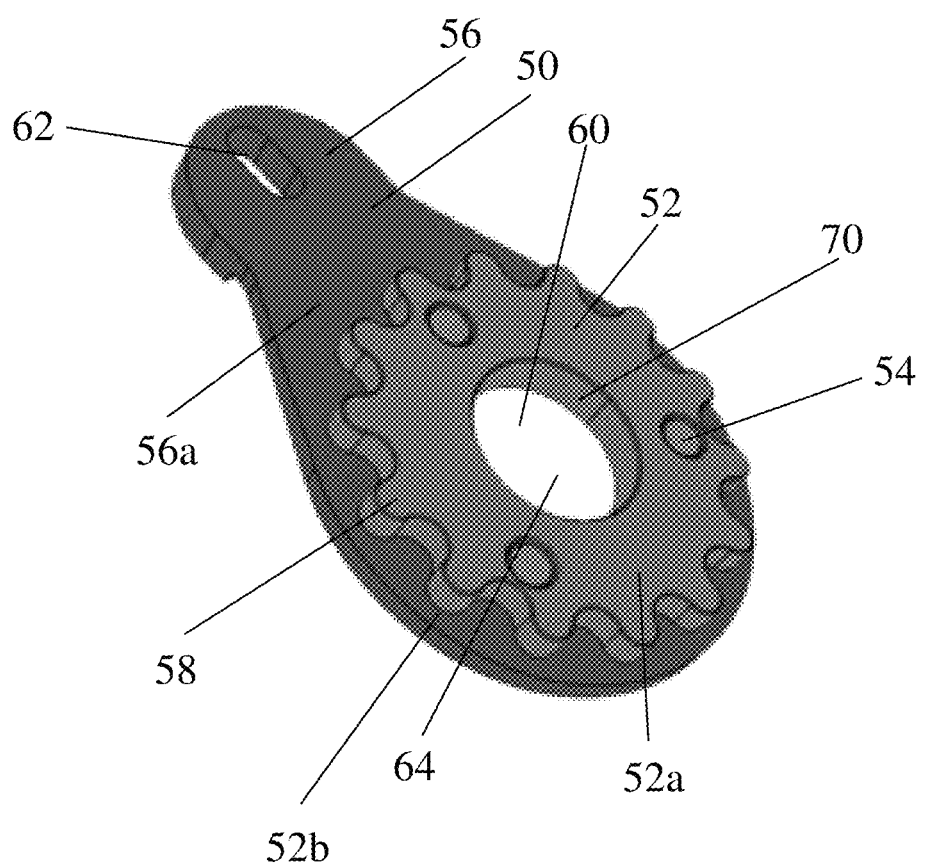
FIG. 5 shows a perspective view of a control plate assembly of the cable hoist system in accordance with an embodiment of the present patent application.
Figure 6:
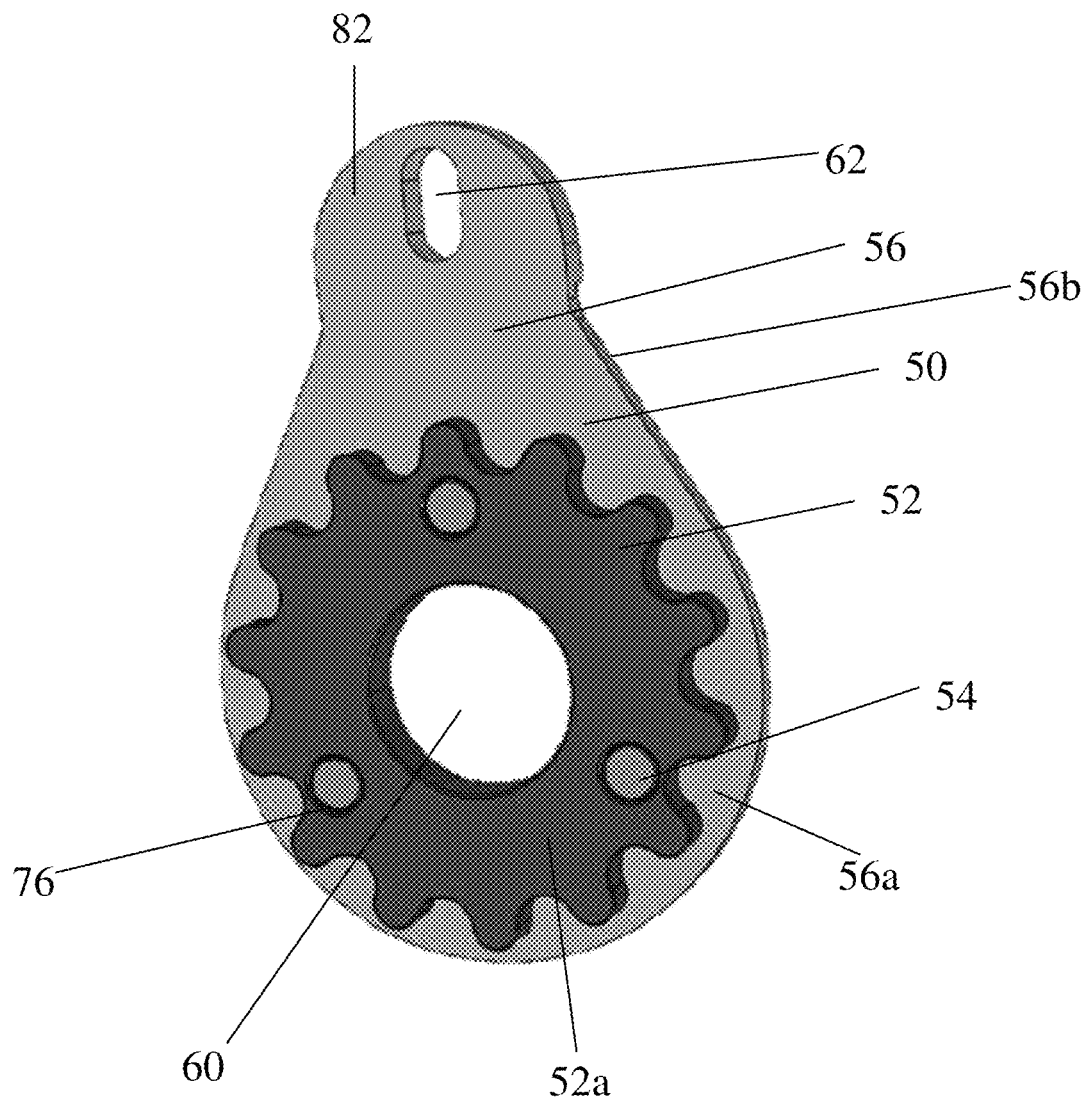
FIG. 6 shows a front perspective view of the control plate assembly in accordance with an embodiment of the present patent application.
Figure 7:
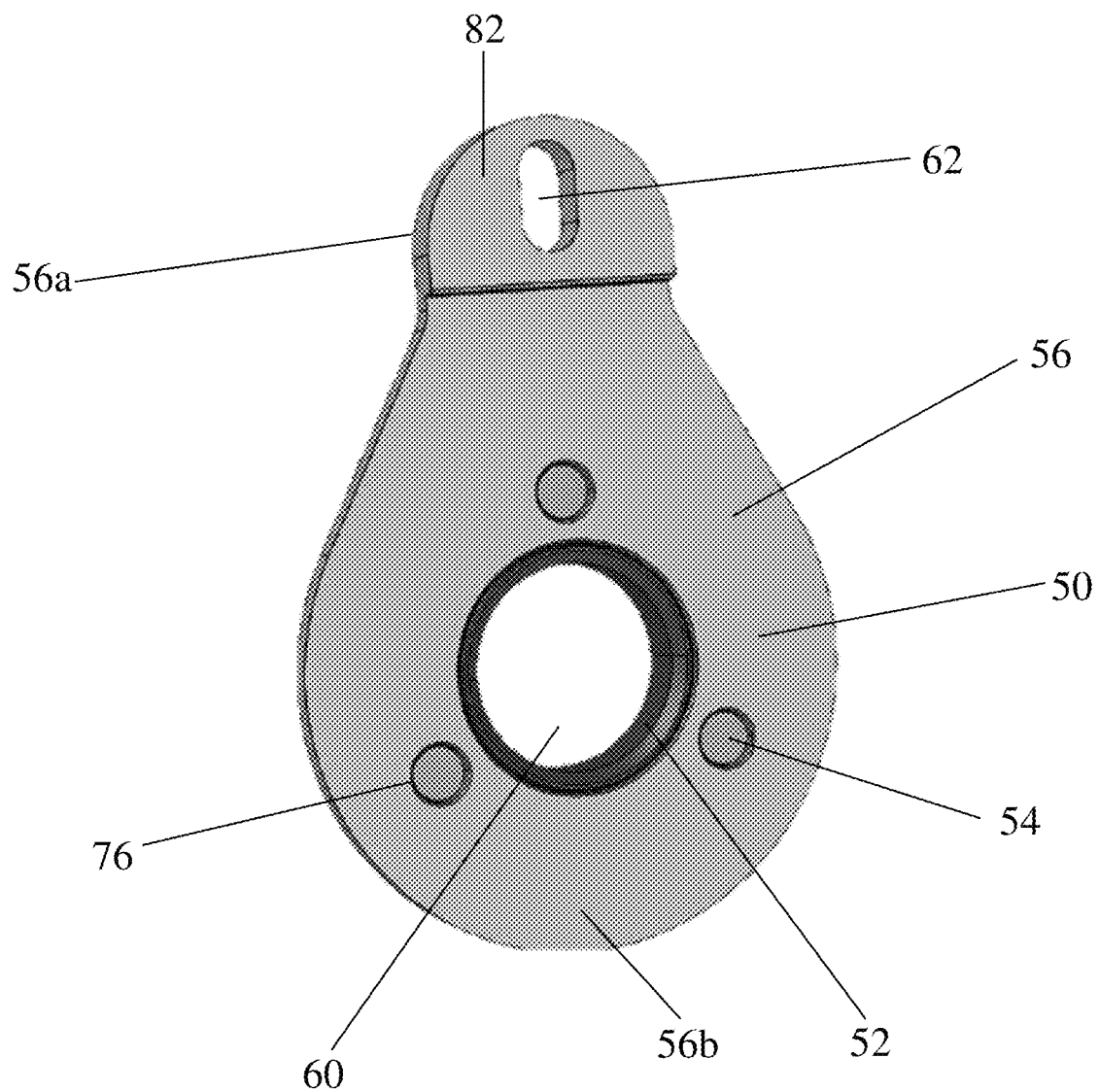
FIG. 7 shows a rear perspective view of the control plate assembly in accordance with an embodiment of the present patent application.
Figure 8:
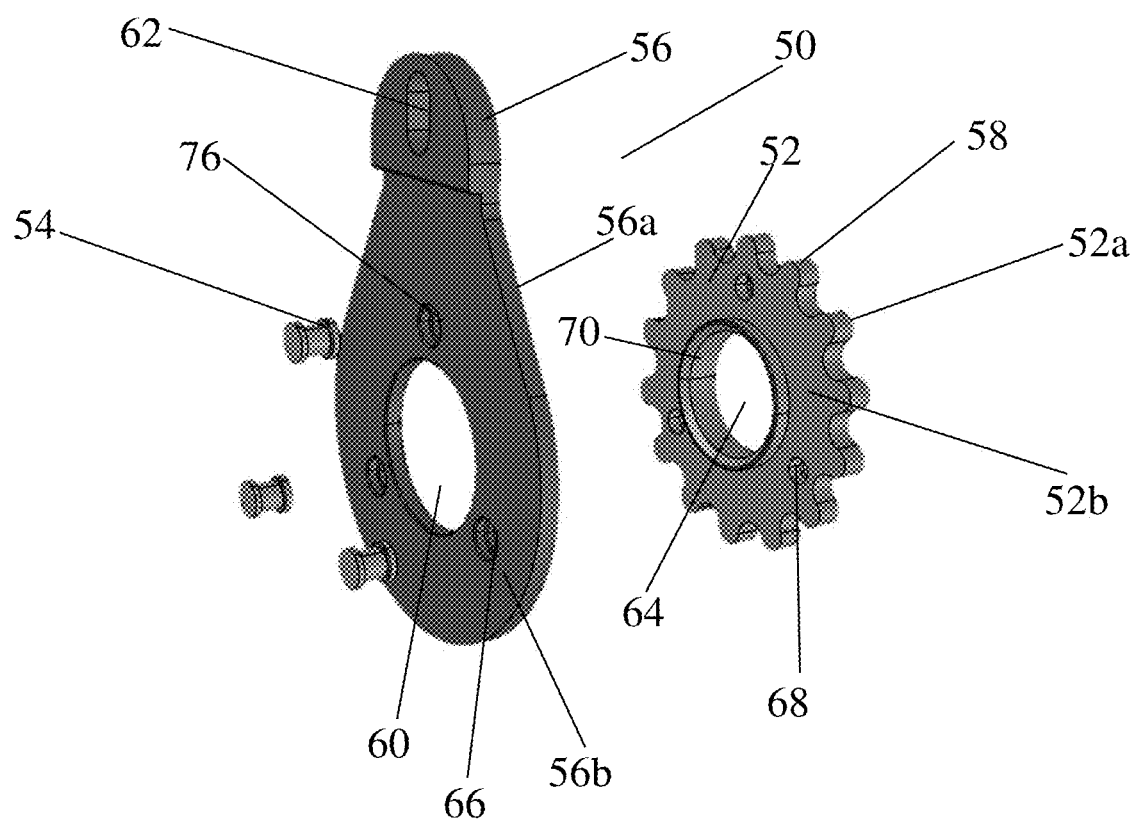
FIG. 8 shows an exploded view of the control plate assembly in accordance with an embodiment of the present patent application.

In one embodiment, the attachment device or the spare tire holder 18 is interchangeably referred to as a lift plate; the energy absorber member 20 is interchangeably referred to as elastic member; the end piece 22 is interchangeably referred to as end fitting or ferrule. In one embodiment, a (spherical) washer element positioned between the attachment device or the spare tire holder 18 and the energy absorber member 20 as shown in FIG. 4.

Figure 29:
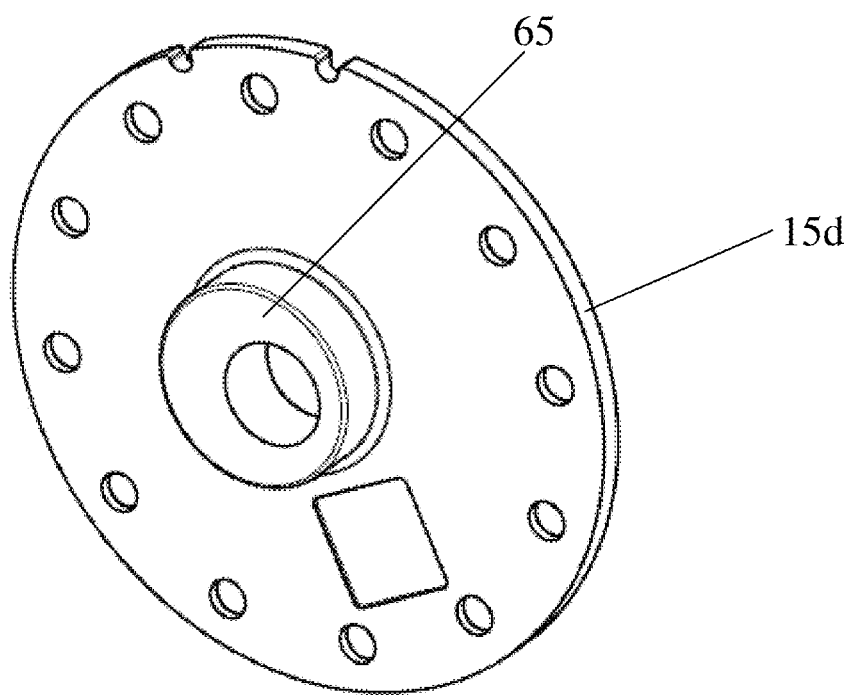
FIGS. 29-30 show various views of an eccentric member of the clutch assembly of the control plate assembly of the spare tire carrier system in accordance with an embodiment of the present patent application.
Figure 30:
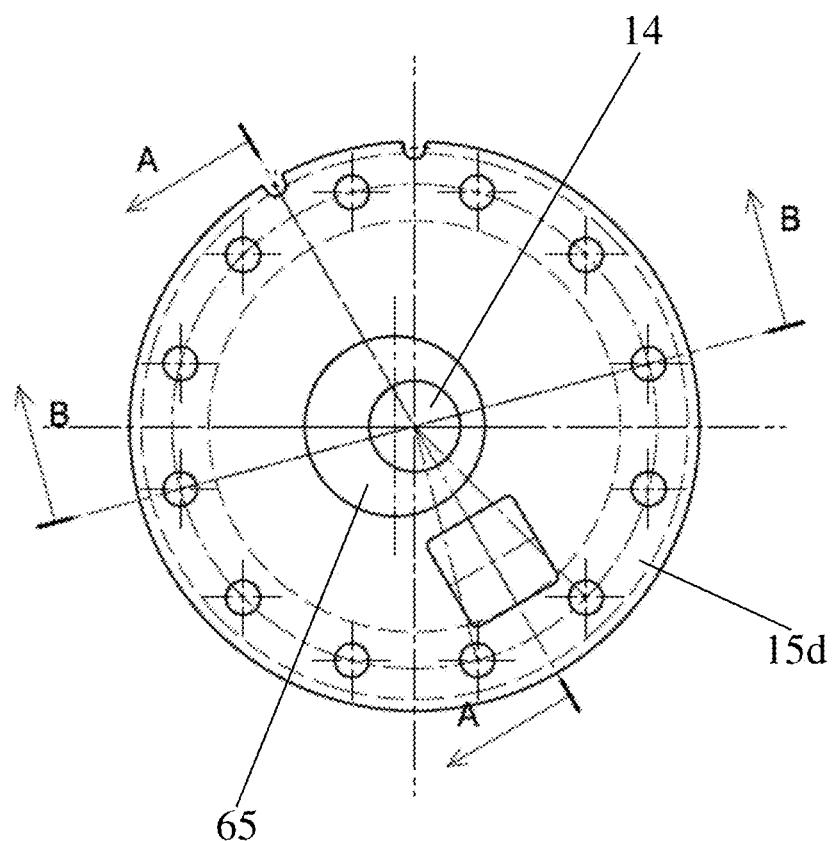

In one embodiment, as will discussed in detail below, the drive/brake mechanism of the hoist system 10 includes the clutch sub-assembly 13 (including the eccentric member), the first gear 52 of the control plate assembly or first gear assembly 50, and the second (or an internal) gear 102 of the cable reel assembly 30. In one embodiment, the eccentric member of the clutch sub-assembly 13 is configured to provide a radially offset connection between the first gear/control plate assembly 50 and the clutch sub-assembly 13. In one embodiment, the eccentric member 65 may also be referred to as a radially offset connector member 65. In one embodiment, the eccentric member drive 65 is generally known for spare tire carriers 10 that use this type of mechanism (i.e., hypocycloidal gear assembly). The eccentric member 65 is, thus, not described in detail in the present patent application. FIGS. 29-30 show various views of the eccentric member 65 of the clutch sub-assembly 13 of the control plate assembly of the spare tire carrier system in accordance with an embodiment of the present patent application. For example, FIGS. 29-30 show a perspective view and a front view, respectively of the eccentric member 65 of the clutch sub-assembly 13 of the control plate assembly of the spare tire carrier system.

The drive shaft 14 rotates the clutch 15c, 15d and the clutch 15c, 15d rotates the eccentric drive 65 carried on clutch plate 15d. The eccentric drive member 65 rotates inside the circular opening 64 of the control plate member 56 and the same opening in the first gear 52. That maintains engagement between portions of the first gear 52 with portions of the teeth of the internal gear 102 on the reel through the complete revolution of the first gear 52. The slot 62 on the control plate member 56 controls the path of the control plate member 56 and first gear 52 and provides for limited angular movement about a fixed pin, which allows the first gear 52 to maintain meshing engagement with the second gear 102 during the complete revolution. The hypocycloidal path created by the eccentric driving by the eccentric member/drive 65 and pivoting action at slot 62 enables the first gear to effectively roll along the second gear with a high gear ratio as the drive shaft is rotated.

That is, the eccentric member 65 moves within the circular/center opening 64 to drive the control plate member 56 and first gear 52 in a path controlled by the slot 62, and that is how the hypocycloid path is created. The eccentric member 65 maintains the first gear 52 in engagement with the teeth on the second gear 102, and the path is constrained by a pin in slot 62 so that the first gear 52 can stay in engagement with the second gear 102 during the revolution. The control plate member 56 predominately moves linearly on the pin in slot 62, with a minor degree of pivoting to as the first gear 52 stays in contact with the second gear 102. One revolution of the first gear 52 should result in a relatively smaller amount of rotation of the second gear 102 and that is how the high gear ratio is achieved.

In one embodiment, the internal/second gear 102 is interchangeably referred to as second gear of a second gear assembly disposed in the reel assembly 30. In one embodiment, the first gear 52 is interchangeably referred to as first gear of the first gear/control plate assembly 50. The internal/second gear 102 is disposed in the reel assembly 30 and is configured to surround the external/first gear 52. The internal/second gear 102 also includes a plurality of internal teeth 106 for meshing engagement with external teeth of the external/first gear 52 such that hypocycloidal revolution of the first gear 52 rotates the second gear 102 to rotate the reel assembly 30. In one embodiment, the number of internal teeth 106 of the second gear 102 is different from the number of external teeth 58 of the first gear 52.

In one embodiment, the cable reel assembly 30 is for a cable hoist for supporting the spare tire and for lifting or lowering the spare tire by means of the cable reel assembly 30 around which the drive cable 16 wraps and is configured to move therealong. In one embodiment, the cable reel assembly 30 is configured to drive the drive cable 16. In one embodiment, the reel assembly 30 is mounted in the housing 12 and is configured to wind and unwind the drive cable 16 thereof for lifting or lowering the spare tire.

In one embodiment, the cable reel assembly 30 is configured to move the spare tire between its storage position and its extended position through rotation of the drive shaft 14 about the axis B-B (shown in FIG. 1B) that is connected to the cable reel assembly 30 inside the shroud 12.

Figure 1B:
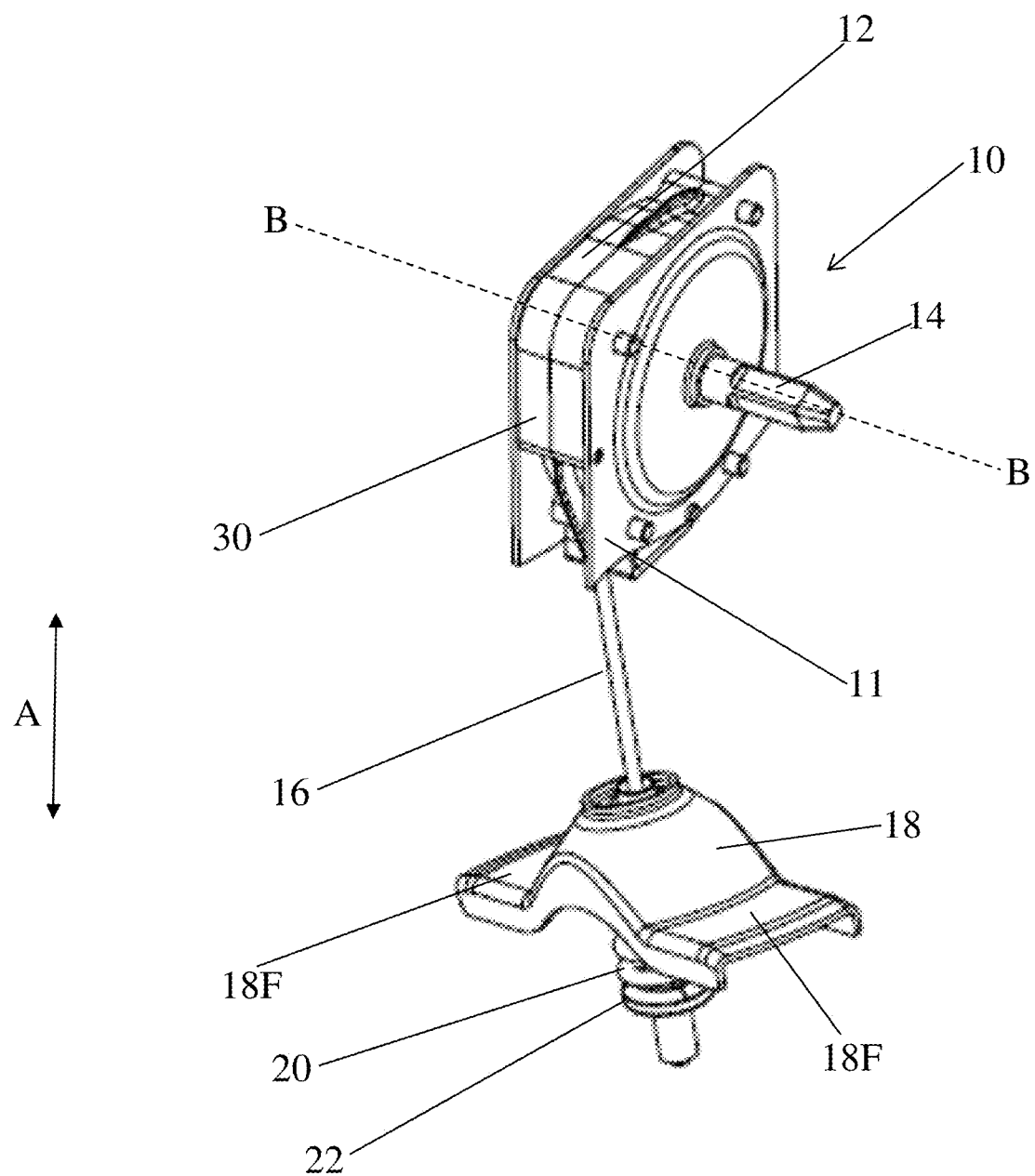
FIG. 1B shows a perspective view of a cable hoist system for a spare tire carrier in a motor vehicle in accordance with an embodiment of the present patent application.
Figure 2:
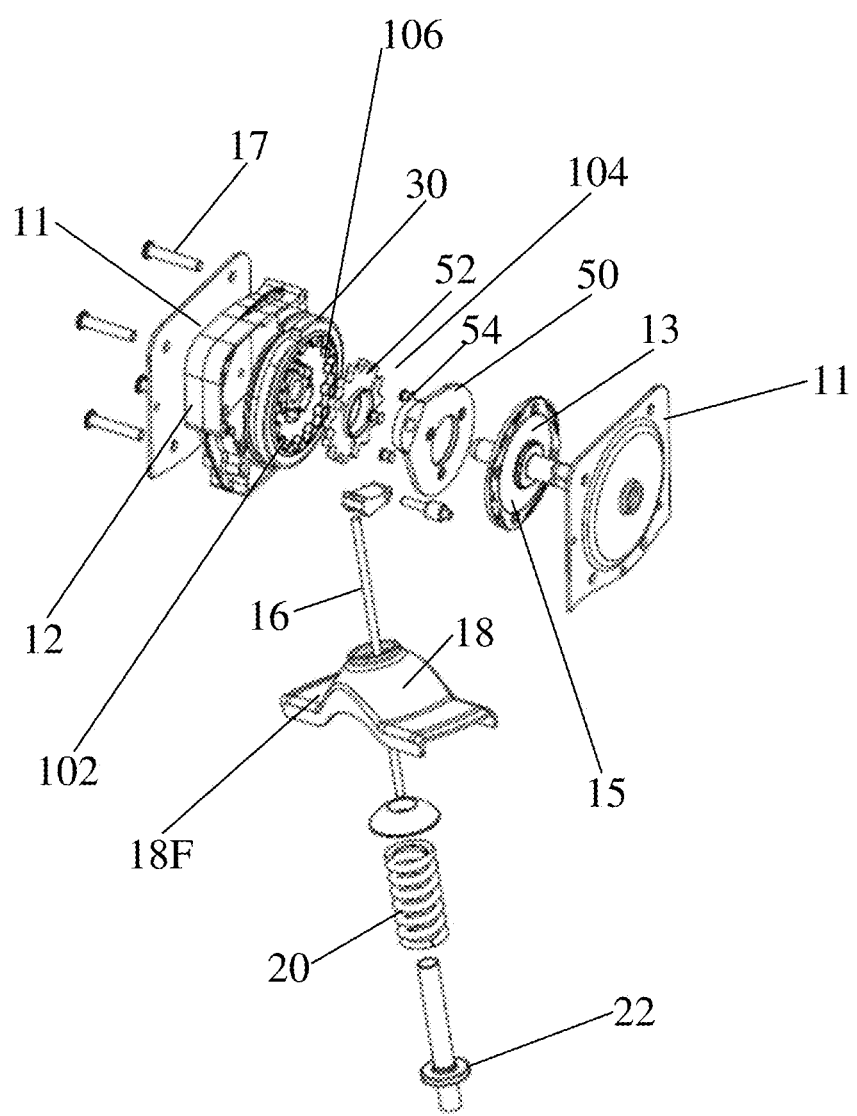
FIG. 2 shows an exploded view of the cable hoist system of FIG. 1B in accordance with an embodiment of the present patent application.

Once rotation is provided to the cable reel assembly 30, the rotational motion can be transferred to the drive cable 16. The drive cable 16 can be moved in either a clockwise direction or a counterclockwise direction. As the drive cable 16 moves about the cable reel assembly 30 within the shroud 12, the drive cable 16 will move substantially vertically (up and/or down, as indicated by arrow A), which in turn moves the end member/piece 22 in a vertical direction to tighten and/or collapse energy absorber member 20 (discussed in detail below). This allows a user to either store or access the spare tire, when needed. For example, when the drive cable 16 is moved in a clockwise direction (in FIGS. 1B and 2), its end member/piece 22 is retracted towards the shroud 12. As the drive cable end retracts, the attachment device or the spare tire holder 18 and the end piece 22 move relative to and towards the shroud 12 until the end piece 22 is adjacent to the attachment device or the spare tire holder 18 and the spare tire is lifted to its storage position adjacent to the undercarriage of the vehicle. Part of the drive cable 16 (i.e., near or at an end opposite the attachment device or the spare tire holder 18) can optionally extend from the shroud 12, such as generally shown in FIGS. 1B and 2.

To access the spare tire, the drive cable 16 is rotated in an opposite direction, i.e., counterclockwise direction via rotation of the cable reel assembly 30, which advances the outer end of the drive cable 16. When the drive cable 16 is advanced, the end piece 22 moves relative to and away from the shroud 12, thereby allowing movement of the spare tire via the attachment device or the spare tire holder 18 downwardly and away from the undercarriage of the vehicle, to an extended position, so that the spare tire may be accessed and removed therefrom.

The drive cable 16 is guided along and by the cable reel assembly 30. The cable reel assembly 30 comprises a reel including a drive portion configured for rotation about the axis B-B (see FIG. 1B). The drive portion of the cable reel assembly 30 is driven via the drive shaft 14, shown in FIG. 1B, for example. The drive portion of the cable reel assembly 30 can be directly connected to the drive shaft 14 through the slot/opening in the shroud 12, for example. In other embodiments, drive portion of the cable reel assembly 30 itself may be the drive input.

In one embodiment, as mentioned above and will also be discussed in detail below, the rotation of eccentric member of the clutch sub-assembly 13 causes the control plate assembly 50 (including the first gear 52) to move so that external gear teeth of external first gear 52 of the control plate assembly 50 are configured to engage with internal gear teeth in the cable reel assembly 30. This in turn causes the cable reel assembly 30 to be driven/rotated within the housing 12 in opposite directions to extend and retract the drive cable 16.

FIGS. 23-28 show various views of the clutch sub-assembly 13 of the control plate assembly of the spare tire carrier system in accordance with an embodiment of the present patent application. For example, FIGS. 23-28 shows a perspective view, a side view, a rear view, a front view, an exploded perspective view and another side view, respectively of the clutch sub-assembly 13 of the control plate assembly of the spare tire carrier system 10.

In one embodiment, the clutch assembly 13 of the present patent application is configured to act as a "slip clutch" that starts skipping when the input torque exceeds given design parameters. This concept is very common in the art and this type of clutch assembly is included in most of the winches. Therefore, the operation of the clutch assembly is not described in detail in the present patent application. In one embodiment, the clutch assembly starts in its engaged state and slips when the torque exceeds the design values or parameters.

In one embodiment, the clutch sub-assembly 13 includes clutch members 15*c*, 15*d* that are configured to be mounted to and about the drive input/shaft 14 when the cable hoist system 10 is in its assembled configuration. In one embodiment, the clutch members 15*c*, 15*d* include ball elements for transmitting torque between the driving/drive member and the driven member. For example, such ball elements are seated in depressions in the driven member and the drive/driving member. When the torque exceeds the design values or parameters, the ball elements ride up out of the depressions in one of the driven member and the drive/driving member (e.g., in a ratcheting action) to decouple the driving member and the driven member.

The clutch member 15*c* of the clutch sub-assembly 13 is configured to be secured for rotation with the drive shaft 14. As the clutch member 15*c* of the clutch sub-assembly 13 is operatively connected to the drive input/shaft 14, the clutch member 15*c* will be driven thereby by the rotation/drive of the drive input/shaft 14. In one embodiment, the clutch sub-assembly 13 includes an eccentric member 65 that is mounted for rotation by the drive shaft 14. In one embodiment, the eccentric member 65 is integrally formed with or is operatively connected/assembled to the clutch member 15*d*.

In the assembled configuration of the cable hoist system 10, surface 15*a* of the clutch member 15 abuts surface 56*b* of the control plate member 56. Also, as will be explained in detail in the discussions below, protruding portion/gear hub 70 of the gear 52 is received in opening 60 of control plate member 56 of the control plate assembly 50 and is positioned about and in bearing relation to an outer peripheral bearing surface of the eccentric member of the clutch sub-assembly 13.

As the first gear 52 is operatively connected to the eccentric member (and the clutch member 15) of the clutch sub-assembly 15 and the clutch member 15 of the clutch sub-assembly 13 is operatively connected to the drive input/shaft 14, the first gear 52 of the control plate assembly 50 will be driven thereby by the rotation/drive of the drive input/shaft 14. In one embodiment, the first gear 52 is configured to move/revolve hypocycloidally around the axis B-B when the drive shaft 14 rotates.

In one embodiment, the drive mechanism 104 further comprises the clutch sub-assembly 13 configured to transfer the rotation of the drive shaft 14 to the first gear assembly 50. In one embodiment, the drive mechanism 104 further comprises a radially offset connector 65 (e.g., eccentric member 65) that is configured to provide a radially offset connection between the first gear assembly 50 and the clutch sub-assembly 13 such that the control plate member 56 of the first gear assembly 50 is configured to be driven by rotation of the drive shaft 14, via the radially offset connection, to revolve the first gear 52, connected to the control plate member 56, in the hypocycloidal path around the axis B-B of the drive shaft 14. In one embodiment, the clutch sub-assembly 13 is configured to transfer rotation from the drive shaft 14 to cause rotation of the control plate member 56 of the first gear assembly 50, which causes the hypocycloidal movement of the first gear 52 connected to the control plate member 56 of the first gear assembly 50. The clutch sub-assembly 13 may be omitted in some embodiments, although it is preferred for inclusion. In an embodiment with no clutch sub-assembly, the eccentric drive 65 would be formed directly on the drive shaft. However, the clutch sub-assembly is preferred in most embodiments to ensure that too much torque is not applied to the gears and other components, such as could occur if the tire sought to be lifted or the cable is caught on another object, or some other condition occurs that jams the reel.

In one embodiment, the cable hoist system 10 includes a downstop 90 (e.g., in the form of a pawl) and a downstop pivot 92. The downstop/pawl 90 is pivotally supported by the downstop pivot 92. In one embodiment, the downstop/pawl 90 includes a passage/an opening 94 through which the drive cable 16 passes.

When the spool/reel of the reel assembly 30 is rotated for winding the drive cable 16 thereon, the downstop/pawl 90 is cammed outwardly and pivoted by the drive cable 16 to its retracted position so that the downstop/pawl 90 does not interfere with rotation of the spool/reel of the reel assembly 30. Thus, during normal operation (i.e., spooling/winding and unspooling/unwinding of the drive cable 16), the downstop/pawl 90 is in its retracted position.

In one embodiment, the downstop/pawl 90 is configured to pivot to engage a notch 96 (e.g., on an outer peripheral surface 98 of the spool/reel of the reel assembly 30) within the reel assembly 30 when the drive cable 16 is fully extended. For example, when the drive cable 16 is fully extended, an inner end portion of the drive cable 16 with the spool 60 is configured to pivot the downstop/pawl 90 so that the downstop/pawl 90 engages the notch 96 to prevent further rotation of the spool/reel of the reel assembly 30. Thus, the downstop/pawl 90 is configured to prevent further rotation of the spool/reel of the reel assembly 30 after the drive cable 16 is fully extended. In one embodiment, the downstop/pawl 90 is configured to sense when the drive cable 16 is fully extended and stop the spool/reel of the reel assembly 30 from further rotation in that direction.

Referring to FIGS. 2-3 and 5-9, the present patent application provides an energy management of the spare tire carrier's cable with break-away control plate assembly 50. The control plate assembly 50 in general is a common part within the cable hoist system 10, as it includes one of the internal first gears 52 for the drive/brake mechanism of the cable hoist system 10. The present patent application provides a multi-piece design of the control plate assembly 50, using the frangible connectors or rivets 54 as shear pins. The break-away control plate configuration of the spare tire carrier system of the present patent application is configured to prevent the winch/drive cable 16 from breaking in a crash event and allow the drive cable 16 to spool out, and under normal (non-crash) conditions it will maintain the connection to drive the reel to take-up or unwind the cable for raising/lowering the tire. Specifically, the break-away control plate configuration of the spare tire carrier system is configured to separate the first gear 52 and the control plate member 56 (i.e., due to breakage of/shearing the frangible connectors or rivets 54) so as to allow the drive cable 16 to pay out and also to reduce tension in the drive cable 16 under crash conditions (i.e., when a force exceeding a predetermined value is applied to the drive cable 16 and/or the control plate assembly 50). In one embodiment, the control plate assembly is interchangeably referred to as a hypocycloidal gear assembly.

Prior art/existing control plates typically include one piece construction and do not break from high cable forces. Implementing the break-away control plate assembly 50 of the spare tire carrier system 10 of the present patent application instead of a secondary cable (tether) used in the prior art spare tire carrier systems is also advantageous as the break-away control plate configuration of the spare tire carrier system 10 of the present patent application reduces the overall weight of the spare tire carrier system compared to the prior art spare tire carrier systems that uses the secondary cable. Also, there are fewer components and no extra attachments for the vehicle owner (i.e., connecting a secondary cable to the spare tire). However, the present patent application may also be practiced with both the break-away control plate assembly 50 and a secondary cable as an additional safety feature in some embodiments.

The control plate assembly 50 includes the control plate member (also referred to as an arm) 56 and the first gear 52 connected to each other using the frangible connectors or rivets 54. In one embodiment, the control plate assembly 50 (with the control plate member 56 and the first gear 52) is mounted for driving by the eccentric member of the clutch sub assembly 13 that is mounted for rotation on the drive shaft 14. The control plate/first gear assembly 50 is configured to move/revolve in the hypocycloidal path/hypocycloidally around the axis B-B when the drive shaft 14 rotates, as discussed above. The first gear 52 of the control plate/first gear assembly 50 has a plurality of external teeth thereon.

In one embodiment, the first gear assembly/control plate assembly 50 includes the control plate member 56 connected to the first gear 52 using at least two frangible connectors 54. In one embodiment, the control plate member 56 is configured to be driven by rotation of the drive shaft 14 to revolve the first gear 52 in the hypocycloidal path/hypocycloidally around the axis B-B of the drive shaft 14.

In one embodiment, the control plate member 56 and the first gear 52 are made of a metal material. In another embodiment, the control plate member 56 and the first gear 52 are each made of a powder metal material. The load from the drive cable 16 is transferred through the winch mechanism via the intermeshed gear teeth and transferred to into the control plate member 56 through the frangible connectors or rivets 54. Essentially, when the rivets are intact, the first gear 52 and control plate 56 will travel in the same hypocycloidal path in the unwinding direction, but when the force is sufficiently high to break the rivets the first gear 52 is freed to rotate freely relative to the control plate member 56 so that the cable can be paid out. A portion of the energy driving the tire forward (assuming a crash while the vehicle is travelling in the forward direction) will be absorbed by the breakage of the frangible connectors or rivets 54, thus limiting the amount of energy and momentum remaining for continued travel of the tire.

In one embodiment, the control plate member 56 includes a first surface 56a, a second opposing surface 56b, and openings 60, 62, 66 therethrough. In one embodiment, the control plate member 56 includes an outwardly protruding portion 82 that has opening/slot (e.g., an oblong shaped opening) 62 for receiving one of the rivets 17 to prevent rotation of the control plate assembly 50 while permitting the control plate assembly 50 to move along with the external gear 52 in response to rotation of the eccentric member of the clutch sub assembly 13 (i.e., mounted for rotation by the drive shaft 14). That is, the control plate member 56 and its engagement with the rivet 17 is configured to prevent rotation of the first gear assembly 50 and to allow hypocycloidal movement of the first gear assembly 50.

In one embodiment, referring to FIGS. 18-22, the first gear 52 is an external gear having a plurality of outwardly protruding external gear teeth 58. In one embodiment, the first gear 52 includes a first surface 52a, a second opposing surface 52b, and openings 64, 68 therethrough. In one embodiment, the plurality of peripherally spaced gear teeth 58 are formed at an outer periphery of the first gear 52. In one embodiment, the first gear 52 includes the protruding portion (also referred to as the gear hub) 70 that is positioned around the opening 64 and extends outwardly and away from the second surface 52b of the first gear 52.

Figure 12:
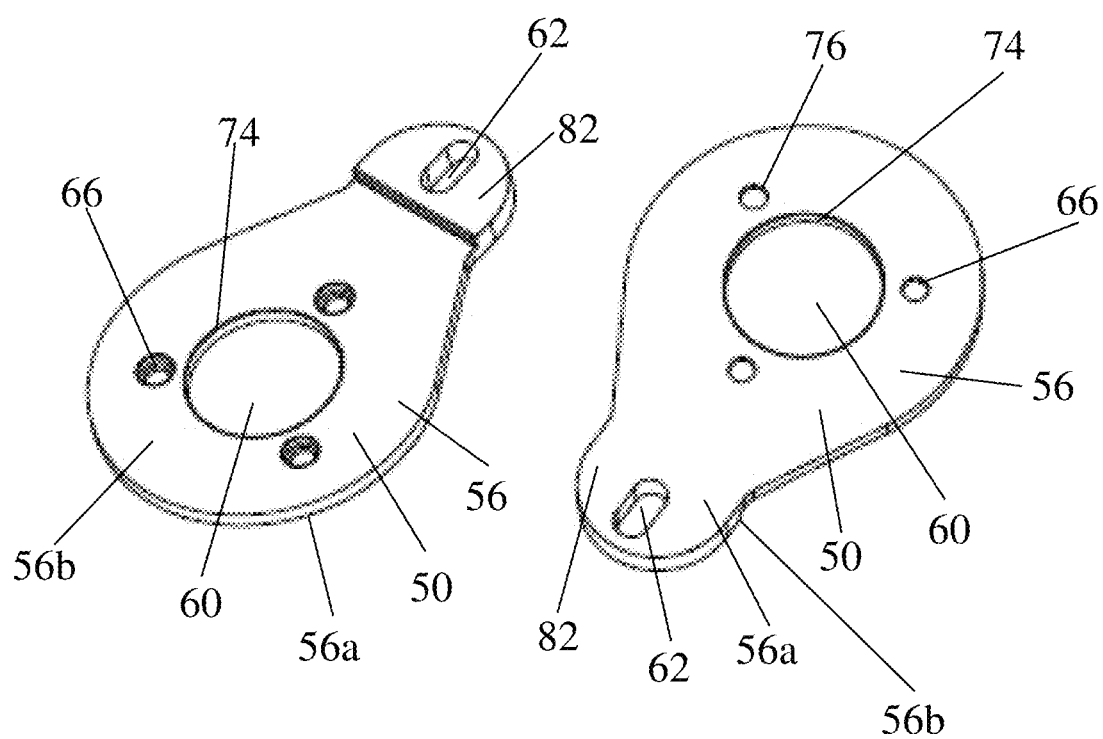
FIG. 12 shows a rear perspective view and a front perspective view of the control plate member of the control plate assembly of the spare tire carrier system, the control plate member is shown by itself without the gear connected thereto, in accordance with an embodiment of the present patent application.
Figure 13:
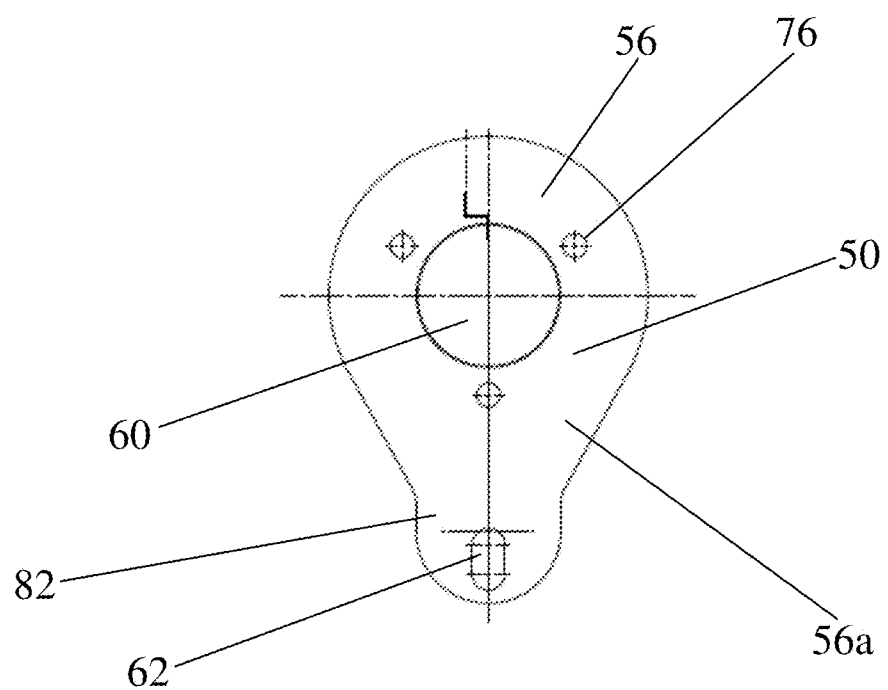
FIGS. 13-15 show a front view, a rear view, and a sectional view taken along a section B-B of FIG. 13, respectively, of the control plate member of the control plate assembly of the spare tire carrier system, the control plate member is shown by itself without the gear connected thereto, in accordance with an embodiment of the present patent application.
Figure 14:
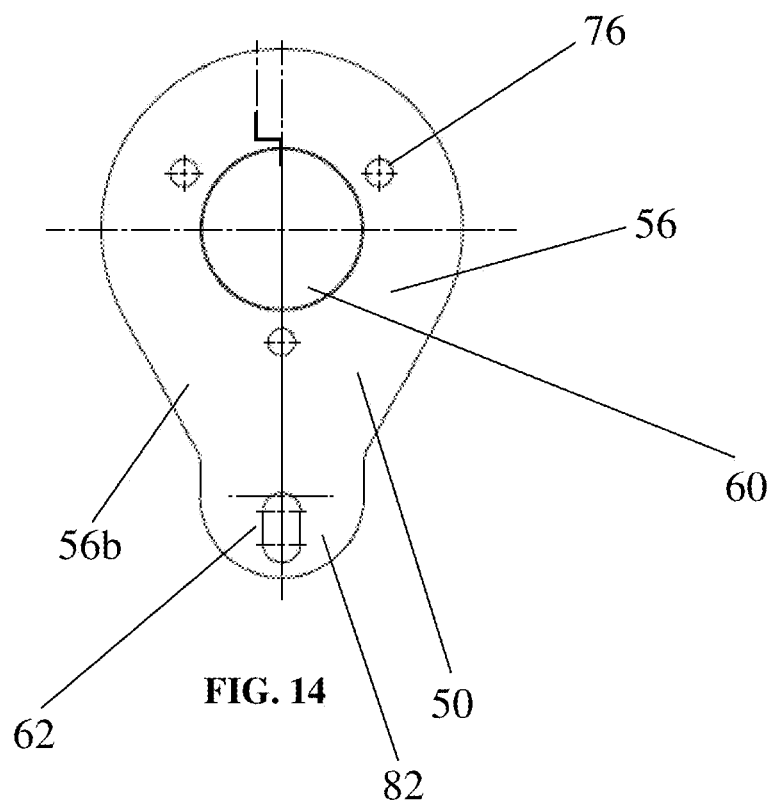
Figure 15:
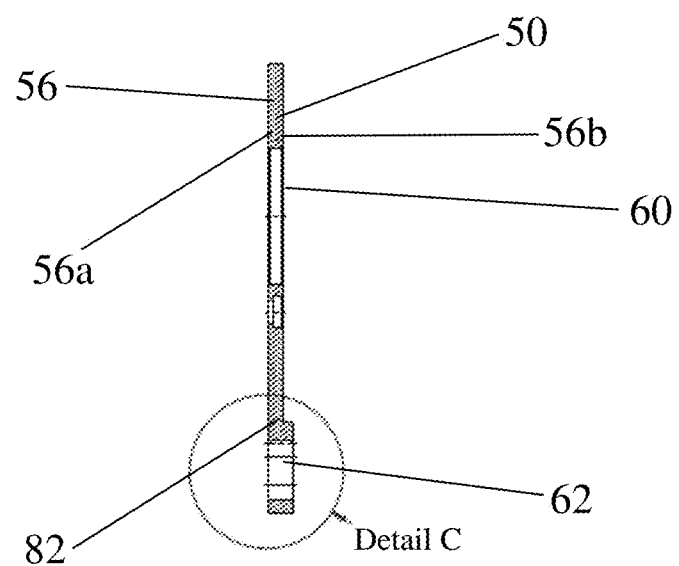
Figure 16:
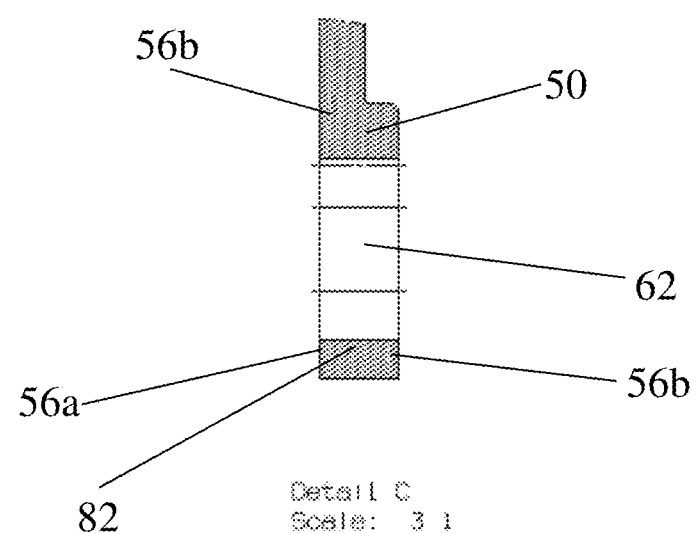
FIGS. 16-17 show a detailed view of detail C in FIG. 15 and a detailed view of detail D in FIG. 14, respectively, of the control plate member of the control plate assembly of the spare tire carrier system, the control plate member is shown by itself without the gear connected thereto, in accordance with an embodiment of the present patent application.
Figure 17:
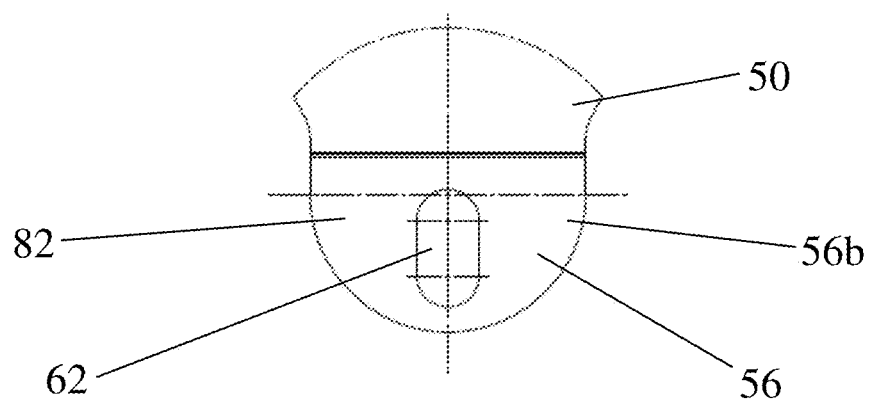
Figure 18:
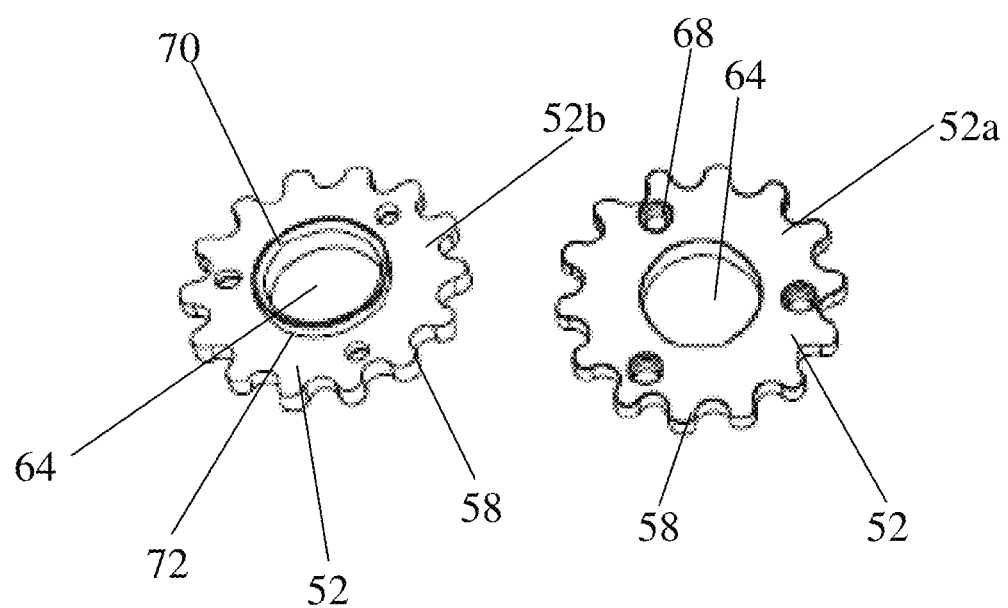
FIG. 18 shows a rear perspective view and a front perspective view of the gear of the control plate assembly of the spare tire carrier system, the gear is shown by itself without the control plate member connected thereto, in accordance with an embodiment of the present patent application.
Figure 19:
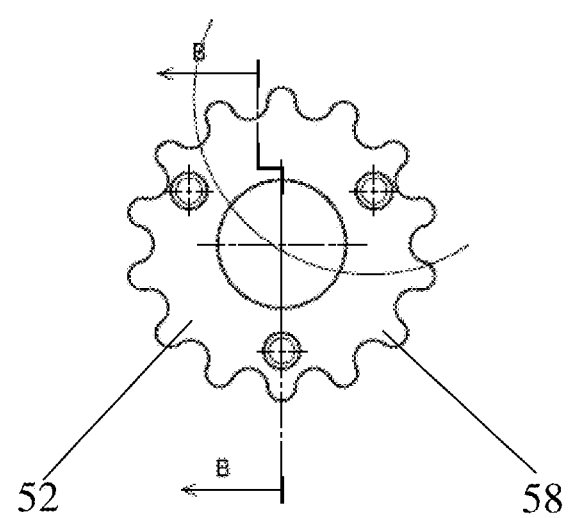
FIGS. 19-21 show a front view, a rear view, and a sectional view taken along a section B-B of FIG. 19, respectively, of the gear of the control plate assembly of the spare tire carrier system, the gear is shown by itself without the control plate member connected thereto, in accordance with an embodiment of the present patent application.
Figure 20:
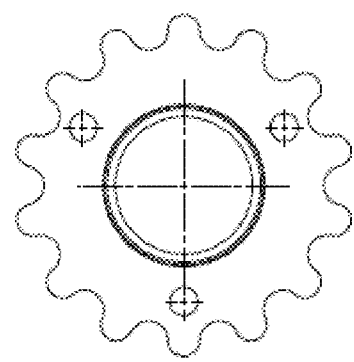
Figure 21:
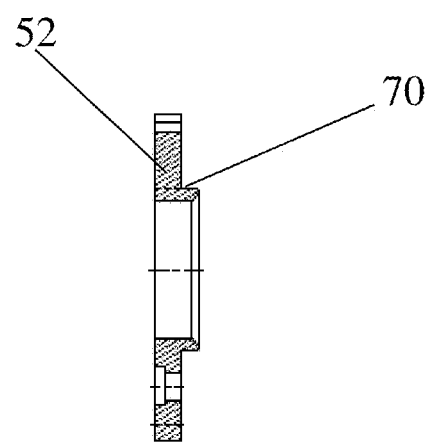
Figure 22:
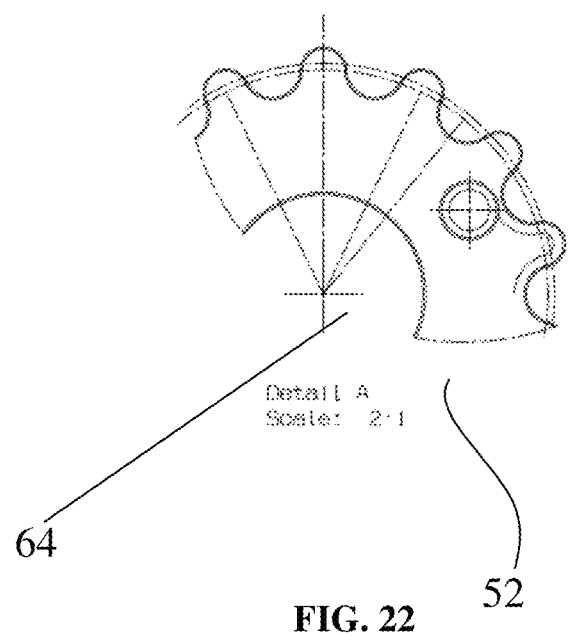
FIG. 22 shows a detailed view of detail A in FIG. 19 of the gear of the control plate assembly of the spare tire carrier system, the gear is shown by itself without the control plate member connected thereto, in accordance with an embodiment of the present patent application.
Figure 23:
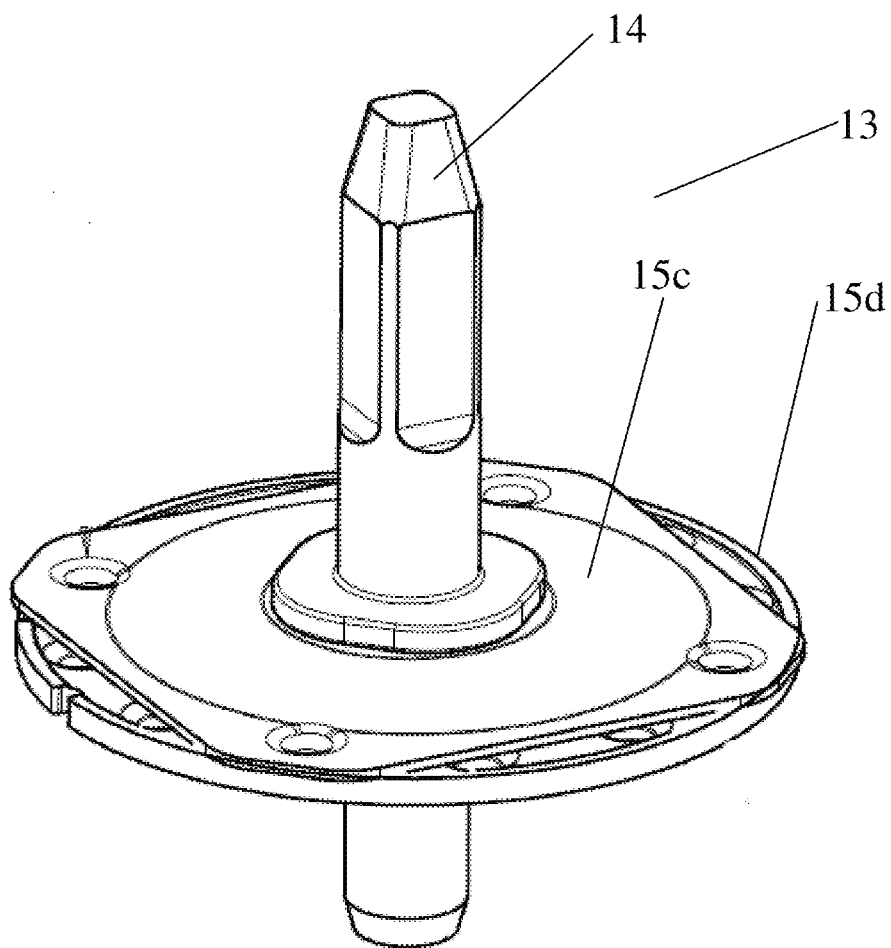
FIGS. 23-28 show various views of a clutch assembly of the control plate assembly of the spare tire carrier system in accordance with an embodiment of the present patent application.
Figure 24:
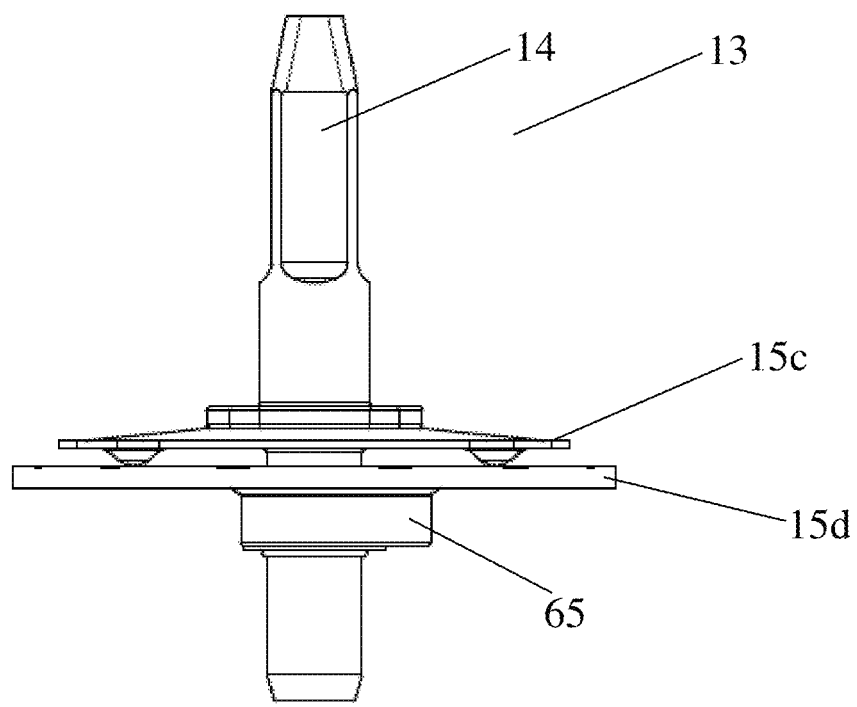
Figure 25:
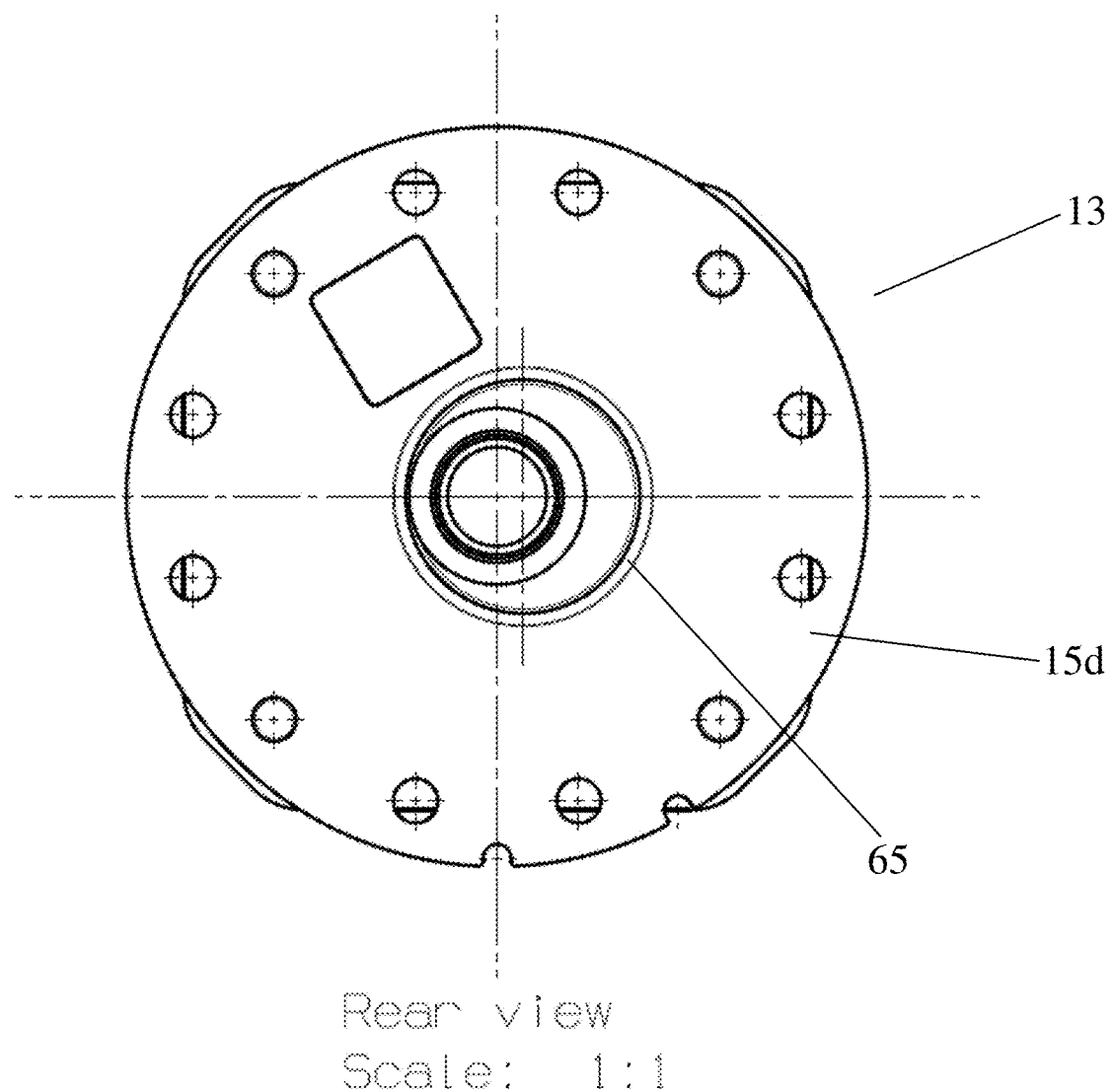
Figure 26:
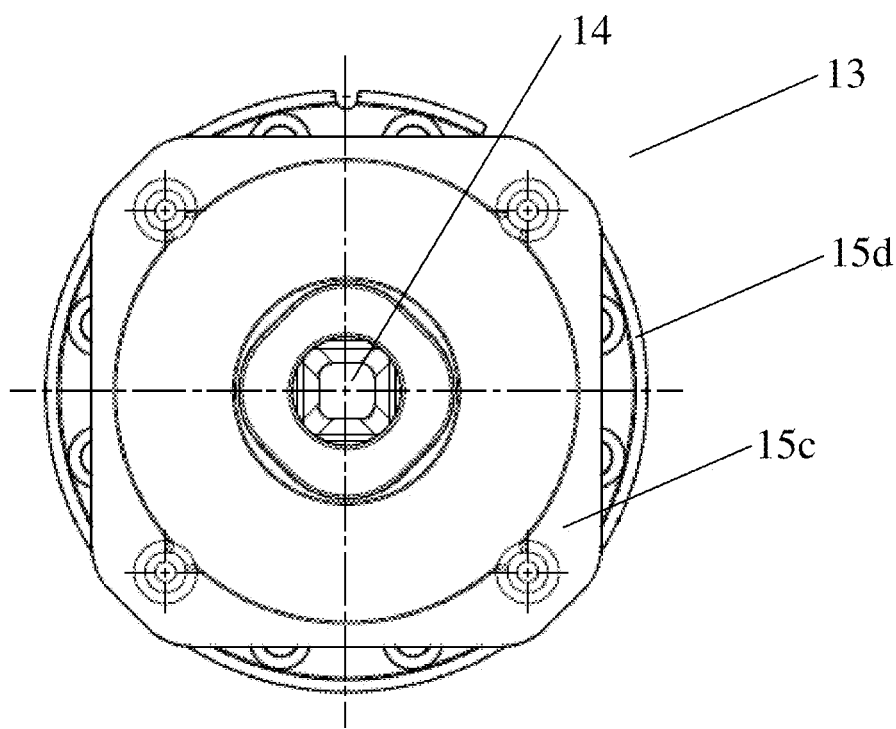
Figure 27:
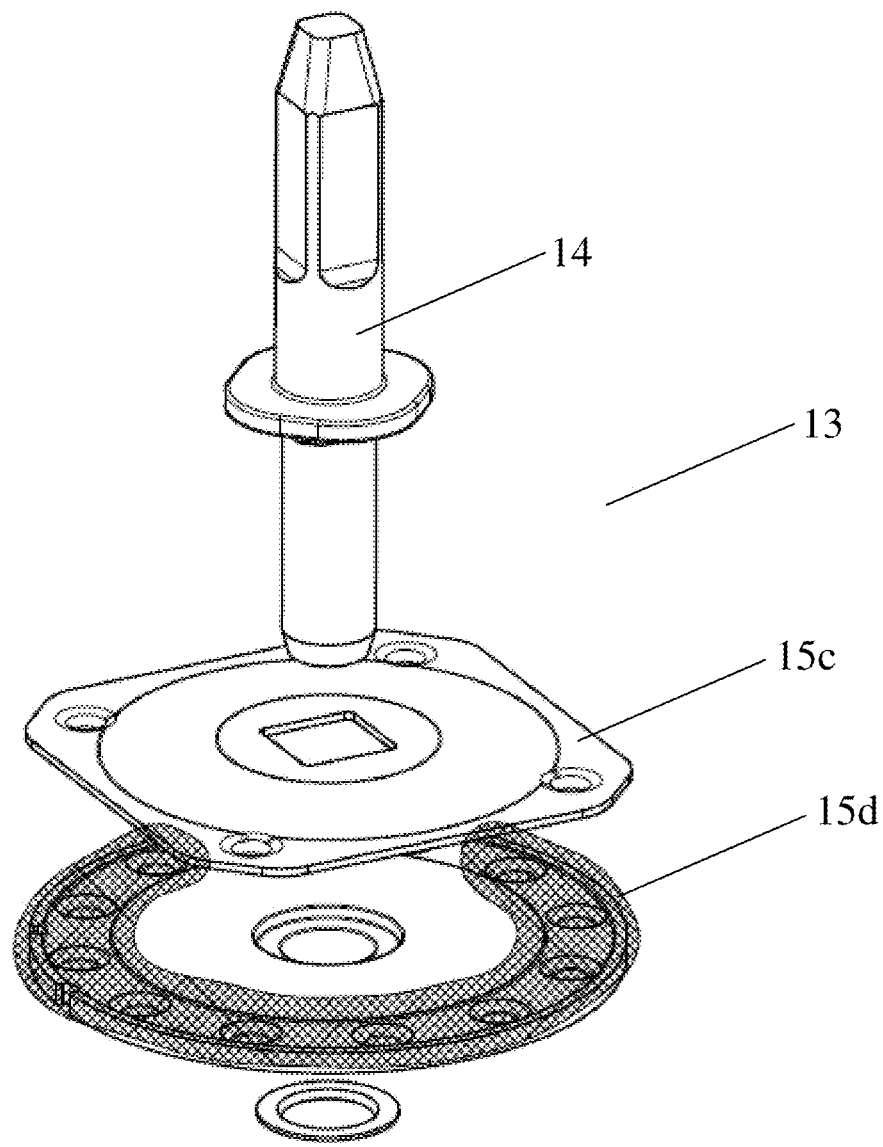
Figure 28:
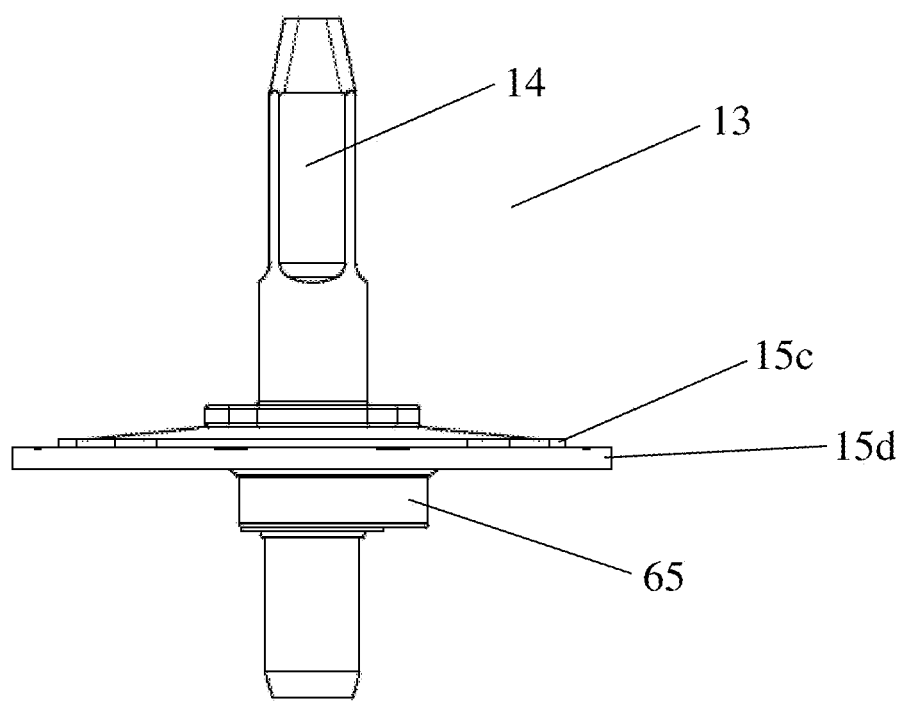

In one embodiment, the control plate member 56 and the first gear 52 are positioned such that 1) at least a portion of the first surface 56a of the control plate member 56 is in contact with at least a portion of the second surface 52b of the first gear 52; 2) the opening 60 of the control plate member 56 is aligned with the opening 64 of the first gear 52; 3) outer peripheral surface 72 (as shown in FIG. 18) of the protruding portion 70 of the first gear 52 is in contact with inner peripheral surface 74 (as shown in FIG. 12) of the opening 60 of the control plate member 56; and 4) the openings 66 of the control plate member 56 are aligned with the openings 68 of the first gear 52.

Figure 9:
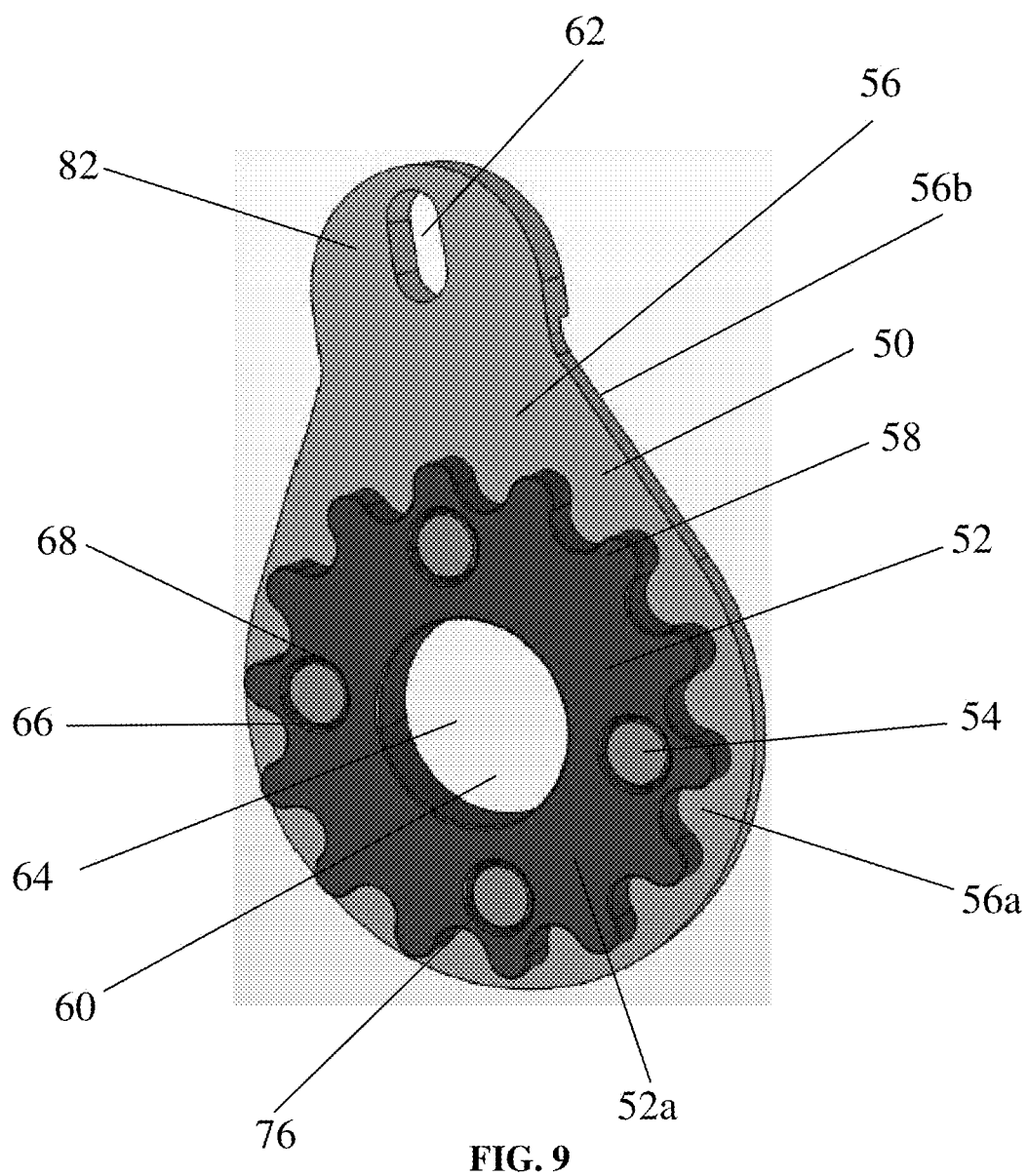
FIG. 9 shows a front perspective view of a control plate assembly of the spare tire carrier system in accordance with another embodiment of the present patent application.

In one embodiment, the frangible connectors or rivets 54 extend into the aligned openings 66, 68 of the control plate member 56 and the first gear 52, respectively, such that the frangible connectors or rivets 54 mechanically connect the control plate member 56 and the first gear 52 (e.g., at a plurality of connection regions 76). In one embodiment, the control plate assembly 50 includes three connection regions 76 as shown in FIGS. 2-4, 5-8 and 12-15. In another embodiment, the control plate assembly 50 includes four connection regions 76 as shown in FIG. 9.

In one embodiment, the control plate member 56, the first gear 52 and the frangible connectors or rivets 54 can be made from the same material. In another embodiment, the control plate member 56, the first gear 52 and the frangible connectors or rivets 54 can be made from different types of materials.

Figure 10:
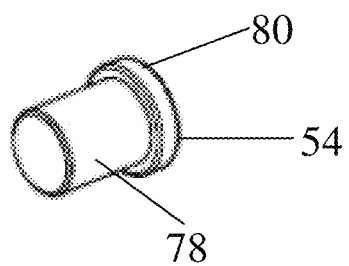
FIG. 10 shows a perspective view of a rivet that connects a control plate member and a gear of the control plate assembly of the spare tire carrier system in accordance with an embodiment of the present patent application.
Figure 11:
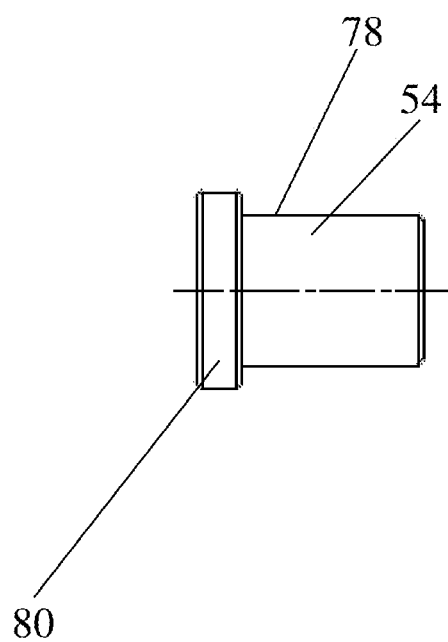
FIG. 11 shows a front view of the rivet that connects the control plate member and the gear of the control plate assembly in accordance with an embodiment of the present patent application.

In one embodiment, as shown in FIGS. 10-11, each frangible connector or rivet 54 includes a shaft portion 78 and a head portion 80. In one embodiment, the frangible connectors or rivets 54 are configured to connect the control plate member 56 and the first gear 52 to each other, but the frangible connectors or rivets 54 are also configured to be broken when the control plate assembly 50 (including the control plate member 56, the frangible connectors or rivets 54 and the first gear 52) receives an excessive load during a vehicle crash (e.g., rear end crash) event. That is, when the frangible connectors or rivets 54 break, shaft portions 78 become separated from their respective head portions 80, thus, breaking the connection made by the frangible connectors or rivets 54 between the control plate member 56 and the first gear 52. Breaking the connection made by the frangible connectors or rivets 54 between the control plate member 56 and the first gear 52 allows the drive cable 16 to be paid out. Breaking the connection made by the frangible connectors or rivets 54 between the control plate member 56 and the first gear 52 also decreases the tension in the drive cable 16. In one embodiment, the frangible connectors or rivets 54 act as "shear pins" when the cable load increases during the vehicle crash event.

In the illustrated embodiment, there are either three frangible connectors or rivets 54 (as shown in FIG. 4) or four frangible connectors or rivets 54 (as shown in FIGS. 2 and 3) connecting the first gear 52 and the control plate member 56. In another embodiment, the number of frangible connectors or rivets connecting the first gear 52 and the control plate member 56 of the control plate assembly 50 may vary. In one embodiment, the number of the frangible connectors or rivets 54 and the size of the frangible connectors or rivets 54 connecting the first gear 52 and the control plate member 56 directly correlate to tensile strength and breaking force of the drive cable 16. In another embodiment, the number of the frangible connectors or rivets 54 and the size of the frangible connectors or rivets 54 connecting the first gear 52 and the control plate member 56 could be adjusted for different drive cable 16 strength requirements. More specifically, the ultimate shear strength of the rivets (or other frangible connectors) 54, i.e., the amount of load that causes the rivet/frangible connector 54 to break away, is selected such that the frangible connector(s) or rivets 54 break before the drive cable 16 reaches its ultimate tensile strength at which it will break. In one embodiment, the frangible connector(s) 54 break when about 60% to 90% of the force applied to the drive cable 16 that would otherwise cause it to break. In one embodiment, the frangible connector(s) 54 break when about 50% to 80% of that force applied to the drive cable 16 that would otherwise cause it to break.

In one embodiment, at least two frangible connectors 54 connecting the control plate member 56 and the first gear 52 provide frangible connections 76 in the first gear assembly 50 such that, when the first gear assembly is subject to a force exceeding a predetermined value caused by momentum of the spare tire applied through the reel assembly 30 and the second gear 102, the at least two frangible connectors 54 break to allow the first gear 52 to move relative to the control plate member 56 such that the second gear 102 and the reel assembly 30 can rotate to allow for pay out of the drive cable 16. In one embodiment, the at least two frangible connectors 54 includes a shear pin 54 that is configured to shear when the first gear assembly 50 is subject to the force exceeding the predetermined value.

As assembled, the control plate member 56, the first gear 52 and the frangible connectors or rivets 54 function as one assembly/system for everyday use to raise & lower the spare tire. When a vehicle experiences a crash (at the back end), the impact forces are transferred from the rear bumper into the spare tire. The spare tire is connected to the vehicle via the winch's main drive cable 16. As the spare tire keeps moving from the crash, the main drive cable 16 gets pulled and could eventually exceed the cable's minimum breaking strength. If the drive cable 16 breaks, the spare tire can separate from the vehicle and cause further damage to person or property. With this break-away control plate assembly 50, the frangible connectors or rivets 54 will shear as the drive cable 16's force approaches the minimum breaking strength. When the frangible connectors or rivets 54 shear, the drive cable 16 de-couples from the drive/brake mechanism and the drive cable 16 can extend, thus reducing the stress. The spare tire can continue moving forward in the vehicle while still maintaining a connection between the spare tire and the winch.

In one embodiment, the cable hoist system 10 includes a control/control system that is configured to interrupt the rotation of the reel before the cable 16 is completely unwrapped/unspooled from the spool.

In one embodiment, a motor drives the input/drive shaft 14. The drive/input shaft 14 rotates the clutch 15c, 15d, and the clutch 15c, 15d rotates the control plate member 56 via the radially offset connection at 64 of the radially offset connector 65, and that drives the external gear 52 in the hypocycloidal path/hypocycloidally around the input/drive shaft 14 in engagement with the internal teeth of the second gear 102 of the cable reel assembly 30.

The portions and dimensions of various parts of the cable hoist system 10 and the control plate assembly 50 as shown in FIGS. 1B-22 are intended to be merely exemplary and not limiting in anyway. The various parts of the cable hoist system 10 and the control plate assembly 50 as shown in FIGS. 1B-22 are drawn to scale in accordance with one embodiment, although other scales and shapes may be used in other embodiments. The dimensions of various parts of the control plate assembly 50 as shown in FIGS. 10-22 are measured in millimeters (mm).

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A cable hoist system for a spare tire carrier in a vehicle comprising:
    a housing configured for supporting a drive shaft for rotation about an axis;
    a drive cable configured for supporting a spare tire and for lifting or lowering the spare tire;
    a reel assembly mounted in the housing and configured to wind and unwind the drive cable thereof for lifting or lowering the spare tire,
    the drive cable having opposing end portions, one end portion of the drive cable is connected to the reel assembly and the other end portion of the drive cable is connected to a spare tire holder for holding the spare tire; and
    a drive mechanism configured to transfer the rotation of the drive shaft to the reel assembly, the drive mechanism comprising:
        a first gear assembly having a first gear with a plurality of external teeth thereon;
        wherein the first gear assembly includes a control plate member connected to the first gear using at least two frangible connectors, the control plate member is configured to be driven by rotation of the drive shaft to revolve the first gear in a hypocycloidal path around the axis of the drive shaft; and
        a second gear assembly disposed in the reel assembly, the second gear assembly having a second gear configured to surround the first gear and having a plurality of internal teeth for meshing engagement with the plurality of external teeth of the first gear such that hypocycloidal revolution of the first gear rotates the second gear to rotate the reel assembly;
        wherein the at least two frangible connectors extend axially along the axis and are circumferentially disposed about the axis, and
        wherein the at least two frangible connectors connecting the control plate member and the first gear provide frangible connections in the first gear assembly such that, when the first gear assembly is subject to a force exceeding a predetermined value caused by momentum of the spare tire applied through the reel assembly and the second gear, the at least two frangible connectors between the control plate member and the first gear break to allow the first gear to move relative to the control plate member such that the second gear and the reel assembly can rotate to allow for pay out of the drive cable.

2. The cable hoist system of claim 1, wherein the at least two frangible connectors include shear pins that are configured to shear when the first gear assembly is subject to the force exceeding the predetermined value.

3. The cable hoist system of claim 1, wherein the reel assembly includes:
    a drive portion operatively connected to the drive shaft and configured for rotation about the axis;
    a reel mounted to the drive portion and configured to be driven rotationally about the axis by the drive portion to drive the drive cable.

4. The cable hoist system of claim 1, further comprising an elastic member adjacent to the spare tire holder and configured for movement between a storage position and an extended position; and
    wherein the reel assembly is configured to move the elastic member between its storage position and extended position.

5. The cable hoist system of claim 1, wherein an amount of load that causes the at least two frangible connectors to break away, is selected such that the at least two frangible connectors break before the drive cable reaches its ultimate tensile strength at which the drive cable will break.

6. The cable hoist system of claim 1, wherein an ultimate shear strength of the at least two frangible connectors, is selected such that the at least two frangible connectors break before the drive cable reaches its ultimate tensile strength at which the drive cable will break.

7. The cable hoist system of claim 1, wherein the at least two frangible connectors break when about 60% to 90% of a force applied to the drive cable that would otherwise cause the drive cable to break.

8. The cable hoist system of claim 1, wherein the drive mechanism further comprises a clutch assembly configured to transfer the rotation of the drive shaft to the first gear assembly, further comprising a radially offset connector that is configured to provide a radially offset connection between the first gear assembly and the clutch assembly such that the control plate member of the first gear assembly is configured to be driven by rotation of the drive shaft, via the radially offset connection, to revolve the first gear, connected to the control plate member, in the hypocycloidal path around the axis of the drive shaft.

9. The cable hoist system of claim 1, wherein the at least two frangible connectors are only connected between the first gear and the control plate member.

10. The cable hoist system of claim 9, wherein the reel assembly does not include the at least two frangible connectors.

11. The cable hoist system of claim 1, wherein, when the first gear assembly is subject to the force exceeding the predetermined value caused by momentum of the spare tire applied through the reel assembly and the second gear, the at least two frangible connectors between the control plate member and the first gear break to allow the first gear to move with the reel assembly and the second gear and to allow the first gear to move relative to the control plate member such that the first gear, the second gear and the reel assembly can rotate to allow for pay out of the drive cable.

* * * * *